(12) United States Patent
Duppong

(10) Patent No.: US 10,836,576 B2
(45) Date of Patent: Nov. 17, 2020

(54) STORAGE DECKS AND STORAGE RACK ASSEMBLIES INCLUDING SAME

(71) Applicant: J&L Wire Cloth, LLC, St. Paul, MN (US)

(72) Inventor: James A. Duppong, Lake Elmo, MN (US)

(73) Assignee: J&L Wire Cloth, LLC, St. Paul, MN (US)

( * ) Notice: Subject to any disclaimer, the term of this patent is extended or adjusted under 35 U.S.C. 154(b) by 0 days.

(21) Appl. No.: 15/967,527

(22) Filed: Apr. 30, 2018

(65) Prior Publication Data

US 2019/0031439 A1 Jan. 31, 2019

Related U.S. Application Data

(60) Provisional application No. 62/492,110, filed on Apr. 29, 2017.

(51) Int. Cl.
| | |
|---|---|
| *B65G 1/02* | (2006.01) |
| *A47B 96/20* | (2006.01) |
| *A47B 96/02* | (2006.01) |
| *A47B 87/02* | (2006.01) |

(52) U.S. Cl.
CPC ............ *B65G 1/023* (2013.01); *A47B 96/021* (2013.01); *A47B 96/20* (2013.01); *B65G 1/02* (2013.01); *A47B 87/02* (2013.01)

(58) Field of Classification Search
USPC ...... 211/153, 181.1, 187, 188, 133.1, 133.5; 108/108
See application file for complete search history.

(56) References Cited

U.S. PATENT DOCUMENTS

| RE13,914 | E | * | 5/1915 | Dunderdale | .................. 182/194 |
| 1,600,757 | A | * | 9/1926 | Foster | .................... A47B 75/00 |
| | | | | | 211/133.1 |
| 2,562,497 | A | * | 7/1951 | Klein | ........................ A47F 5/01 |
| | | | | | 108/107 |
| 2,680,522 | A | * | 6/1954 | Temple | ...................... A47F 5/13 |
| | | | | | 108/59 |
| 2,850,172 | A | * | 9/1958 | Beckner | ................. A47B 55/02 |
| | | | | | 108/107 |
| 2,919,816 | A | * | 1/1960 | Maslow | ................. A47B 55/02 |
| | | | | | 108/181 |

(Continued)

*Primary Examiner* — Jonathan Liu
*Assistant Examiner* — Devin K Barnett
(74) *Attorney, Agent, or Firm* — Matthew P. Dugan

(57) ABSTRACT

A storage rack assembly includes a storage rack structure that can include a plurality of columns and a plurality of beams interconnecting the columns such that a plurality of storage bays are formed above a base surface. A plurality of storage deck sections include a first storage deck section supported on the storage rack structure within a first storage bay and a second deck section supported within a second storage bay. The first and second storage rack sections are at least partially supported on a common beam of the storage rack structure with one of the first and second storage rack sections including a decking support channel. The decking support channel includes a channel end portion positioned along the common beam with the channel end portion including a clearance tunnel dimensioned to receive a deck wire of the other of the first and second storage rack sections.

21 Claims, 17 Drawing Sheets

(56) References Cited

U.S. PATENT DOCUMENTS

| | | | | |
|---|---|---|---|---|
| 2,919,817 | A * | 1/1960 | Maslow | A47F 5/13 108/181 |
| 3,101,148 | A * | 8/1963 | Brown | A47F 5/13 108/163 |
| 3,148,638 | A * | 9/1964 | Shelor | A47B 96/04 108/108 |
| 3,225,720 | A * | 12/1965 | Maslow | A47B 55/02 108/64 |
| 3,270,404 | A * | 9/1966 | Andreassen | B21D 47/00 29/897.15 |
| 3,297,374 | A * | 1/1967 | Radek | A47F 5/103 312/108 |
| 3,316,864 | A * | 5/1967 | Maslow | A47B 57/54 108/148 |
| 3,481,486 | A * | 12/1969 | Squires | A47B 57/18 211/153 |
| 3,756,680 | A * | 9/1973 | Lerner | A47D 5/00 312/237 |
| 3,763,794 | A * | 10/1973 | Fleck | A47B 55/02 108/64 |
| 3,773,184 | A * | 11/1973 | Brennan | A47B 61/003 211/123 |
| 3,777,673 | A * | 12/1973 | Blazey | A47B 13/08 108/27 |
| 3,870,157 | A * | 3/1975 | Hayward | A47B 61/00 211/90.01 |
| 3,993,002 | A * | 11/1976 | Stroh | A47F 5/13 108/108 |
| 4,267,931 | A * | 5/1981 | Belotta | A47F 5/13 108/102 |
| 4,558,647 | A * | 12/1985 | Petersen | A47F 5/13 108/107 |
| 4,603,781 | A * | 8/1986 | Ryan, Jr. | A47F 5/01 211/153 |
| 4,656,952 | A * | 4/1987 | Schweizer | A47B 57/265 108/11 |
| 4,778,066 | A * | 10/1988 | Stjernberg | A47B 55/02 211/181.1 |
| 4,805,785 | A * | 2/1989 | Pfeifer | A47B 87/0207 211/181.1 |
| 4,955,490 | A * | 9/1990 | Schafer | A47B 57/581 211/187 |
| 5,251,973 | A * | 10/1993 | Hazen | A47B 61/00 211/186 |
| 5,477,789 | A * | 12/1995 | Von Gunten | A47B 57/30 108/108 |
| 5,477,971 | A * | 12/1995 | Howard | A47F 5/101 108/108 |
| 5,695,080 | A * | 12/1997 | Martin | A47B 55/02 211/183 |
| 5,695,081 | A * | 12/1997 | Alkalay | A47B 47/04 108/147.12 |
| 5,779,069 | A * | 7/1998 | Scully | A47B 96/02 211/153 |
| 6,241,107 | B1 * | 6/2001 | Boyer | A47F 5/137 211/106 |
| 6,422,406 | B1 * | 7/2002 | Kessel | A47B 47/03 211/181.1 |
| 6,578,720 | B1 * | 6/2003 | Wang | A47F 5/0093 211/126.15 |
| 6,749,208 | B2 * | 6/2004 | Orozco | A47F 5/137 211/126.1 |
| 7,188,740 | B2 * | 3/2007 | Marchetta | A47B 47/022 108/102 |
| 7,540,510 | B2 * | 6/2009 | Sparkowski | A47F 5/137 108/106 |
| 8,117,970 | B1 * | 2/2012 | Baez | E04H 6/42 108/149 |
| D657,979 | S * | 4/2012 | Sokol | D6/675.1 |
| D701,405 | S * | 3/2014 | Pace | D6/675.2 |
| 9,700,137 | B2 * | 7/2017 | Davis | A47B 96/025 |
| 9,737,141 | B2 * | 8/2017 | Johnson | A47B 55/02 |
| 9,987,876 | B1 * | 6/2018 | Tuang | B42F 7/12 |
| 10,021,856 | B2 * | 7/2018 | Duppong | A01K 1/0151 |
| 10,098,458 | B2 * | 10/2018 | Lindmark | A47B 96/02 |
| 10,214,351 | B2 * | 2/2019 | Duppong | B65G 1/02 |
| D864,494 | S * | 10/2019 | Duppong | D30/120 |
| 2002/0130098 | A1 * | 9/2002 | Simard | A47F 5/01 211/181.1 |
| 2002/0134744 | A1 * | 9/2002 | Kessell | A47B 47/03 211/187 |
| 2002/0162813 | A1 * | 11/2002 | Hall | A47B 47/021 211/133.1 |
| 2004/0007550 | A1 * | 1/2004 | Leeman | A47F 5/101 211/189 |
| 2006/0157435 | A1 * | 7/2006 | Oberhaus | A47B 57/12 211/187 |
| 2007/0023376 | A1 * | 2/2007 | Black | A47B 47/025 211/187 |
| 2007/0175371 | A1 * | 8/2007 | Wyatt | A47B 47/027 110/325 |
| 2007/0205172 | A1 * | 9/2007 | Stitchick | A47B 47/022 211/183 |
| 2008/0073303 | A1 * | 3/2008 | Li | A47B 45/00 211/153 |
| 2009/0272706 | A1 * | 11/2009 | Gusdorf | A47B 55/02 211/153 |
| 2011/0240571 | A1 * | 10/2011 | Ho | A47B 47/021 211/13.1 |
| 2011/0290750 | A1 * | 12/2011 | Lim | A47B 47/00 211/153 |
| 2012/0304592 | A1 * | 12/2012 | McKinney | A47B 96/02 52/798.1 |
| 2013/0098856 | A1 * | 4/2013 | Troyner | A47B 57/402 211/153 |
| 2013/0248290 | A1 * | 9/2013 | Kreller | E04G 7/02 182/222 |
| 2014/0353271 | A1 * | 12/2014 | Kruse | A47F 5/01 211/188 |
| 2015/0313357 | A1 * | 11/2015 | David | A47B 47/0083 211/187 |
| 2015/0359335 | A1 * | 12/2015 | Offerman | A47B 96/024 211/153 |
| 2016/0073774 | A1 * | 3/2016 | Lim | A47B 47/00 211/188 |

\* cited by examiner

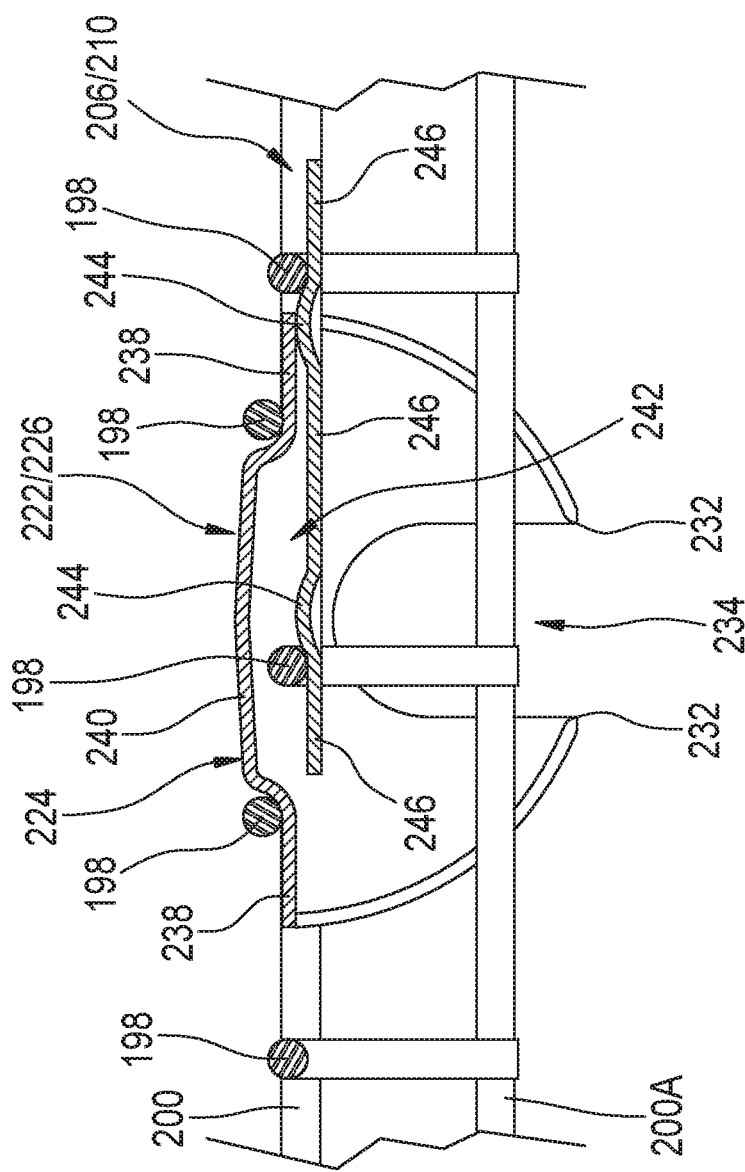

STORAGE DECKS AND STORAGE RACK
ASSEMBLIES INCLUDING SAME

This application claims priority from U.S. Provisional Patent Application No. 62/492,110, filed on Apr. 29, 2017, the entire disclosure of which is hereby incorporated by reference herein.

BACKGROUND

The subject matter of the present disclosure broadly relates to the art of storage and shelving systems and, more particularly, to storage decks dimensioned for support on an associated storage rack as well as storage rack assemblies that include one or more of such storage decks.

Known storage and shelving systems commonly include a storage rack that is supported on a base surface, such as the floor of a building or the paved yard of an outside storage facility, for example. The storage rack is typically constructed from numerous structural columns and beams or rails that together form one or more storage bays that are elevated from the base surface. A storage deck is normally supported on the storage rack within each bay and functions as a support surface for the items and materials that are supported on the storage and shelving system. In many cases, the items and materials are palletized to facilitate transfer of the items and materials onto and off of the support surfaces.

Known storage and shelving systems are often arranged such that multiple bays are positioned adjacent one another. In some cases, storage decks in adjacent bays can be supported on or along a common beam or rail. In conventional constructions, adjacent storage decks could simply be positioned on top of one another such that a portion of each of the two adjacent storage decks extends across and is supported by the common beam or rail. In such constructions, however, the overlapping portions of the adjacent storage decks undesirably result in the formation of a height differential between the overlapping portions of the storage decks. As an alternative, known constructions can include adjacent storage decks that are positioned in a staggered relationship relative to one another in a front-to-back direction along the common beam or rail. However, such constructions can require that selected portions of the storage decks be removed or the storage decks otherwise modified such that the adjacent storage decks can fit together in a desired manner. Unfortunately, such alterations to the adjacent storage decks can undesirably lead to increased installation time and/or costs.

Notwithstanding any commercial success of conventional designs, it is believed that a need exists to overcome the foregoing and/or other disadvantages of known constructions while still retaining comparable or, preferably, improving factors such as performance, ease of manufacture, ease of assembly, ease of installation and/or reduced cost of manufacture. Thus, it is believed to be generally desirable to develop new constructions and/or designs that may advance the art of storage decks and storage rack assemblies that include the same.

BRIEF SUMMARY

One example of a storage deck in accordance with the subject matter of the present disclosure can be dimensioned to abuttingly engage an associated rail of an associated storage rack structure. The storage deck can include a plurality of first deck wires and a plurality of second deck wires that are oriented transverse to the plurality of first deck wires with the pluralities of first and second deck wires secured together to at least partially form a deck section. A decking support channel can extend along the plurality of first deck wires. The decking support channel can include a channel end portion that can include a clearance tunnel dimensioned to receive an associated deck wire of an associated storage deck disposed on the associated storage rack structure adjacent the deck section such that the associated deck wire can extend through the clearance tunnel.

One example of a storage rack assembly in accordance with the subject matter of the present disclosure can be disposed on an associated base surface and can have a front side and a rear side. The storage rack assembly can include a storage rack structure that can include a plurality of columns and a plurality of beams extending between and interconnecting the plurality of columns such that a plurality of storage bays are formed at a non-zero height above the associated base surface. The plurality of storage bays can include a front, a rear and opposing sides with a first storage bay and a second storage bay disposed adjacent one another such that a common beam is disposed therebetween. A plurality of storage deck sections can include a first storage deck section supported on the storage rack structure within the first storage bay and a second deck section supported on the storage rack structure within the second storage bay. The first and second storage rack sections can be at least partially supported on the common beam of the storage rack structure with one of the first and second storage rack sections including a decking support channel. The decking support channel can include a channel end portion positioned along the common beam with the channel end portion including a clearance tunnel dimensioned to receive a deck wire of the other of the first and second storage rack sections.

Another example of a storage rack assembly in accordance with the subject matter of the present disclosure can be disposed on an associated base surface and can have a front side and a rear side. The storage rack assembly can include a storage rack structure that can include a plurality of columns and a plurality of beams extending between and interconnecting the plurality of columns such that a plurality of storage bays are formed at a non-zero height above the associated base surface. The plurality of storage bays can include a front, a rear and opposing sides with a first storage bay and a second storage bay disposed adjacent one another such that a common beam is disposed therebetween. A first storage deck section can include a plurality of first deck wires that at least partially form a first storage deck and a first decking support channel extending along the plurality of first deck wires. The first decking support channel can include a first channel end portion with at least one first deck wire of the plurality of first deck wires extending coextensively along the first channel end portion. The first storage deck is supported on the storage rack structure within the first storage bay such that the first channel end portion and the at least one first deck wire extend across the common beam. A second deck section can include a plurality of second deck wires that at least partially form a second storage deck and a second decking support channel extending along the plurality of second deck wires. The second decking support channel can include a first channel end portion that includes a clearance tunnel. The second deck section can be supported on the storage rack structure within the second storage bay such that the first channel end portion of the second decking support channel at least partially overlaps the first channel end portion of the first decking support channel along an opposite side from the common beam.

BRIEF DESCRIPTION OF THE DRAWINGS

FIG. 17 is a cross-sectional view of the portion of the exemplary storage deck assembly in FIG. 15 taken from along line 17-17 therein.

DETAILED DESCRIPTION

Turning now to the drawings, it is to be understood that the showings are for purposes of illustrating examples of the subject matter of the present disclosure and that the showings are not intended to be limiting. Additionally, it will be appreciated that the drawings are not to scale and that portions of certain features and/or elements may be exaggerated for purposes of clarity and/or ease of understanding.

Figure 1:
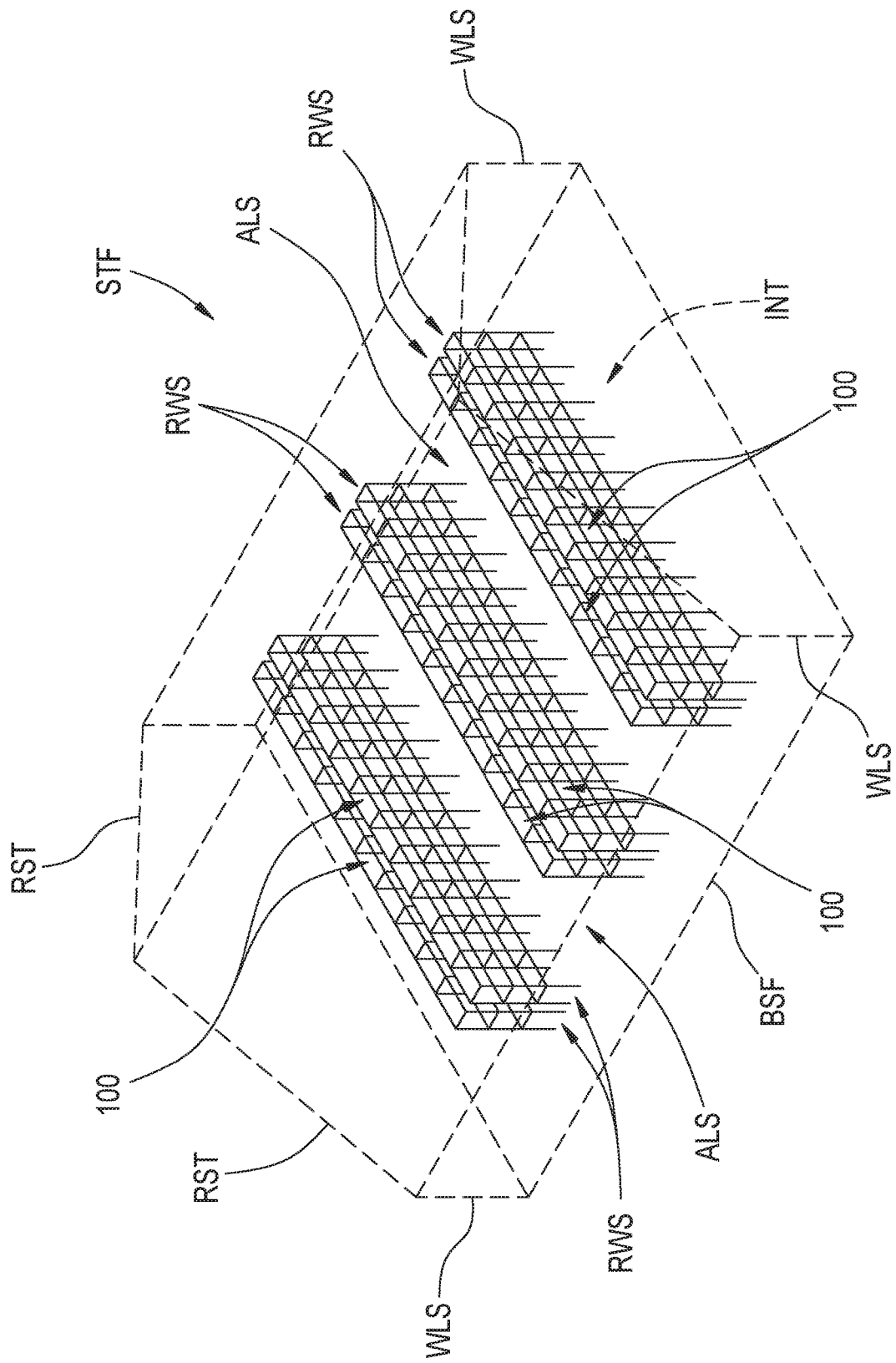
FIG. 1 is schematic representation of a storage facility including multiple rows of storage rack assemblies in accordance with the subject matter of the present disclosure.
Figure 2:
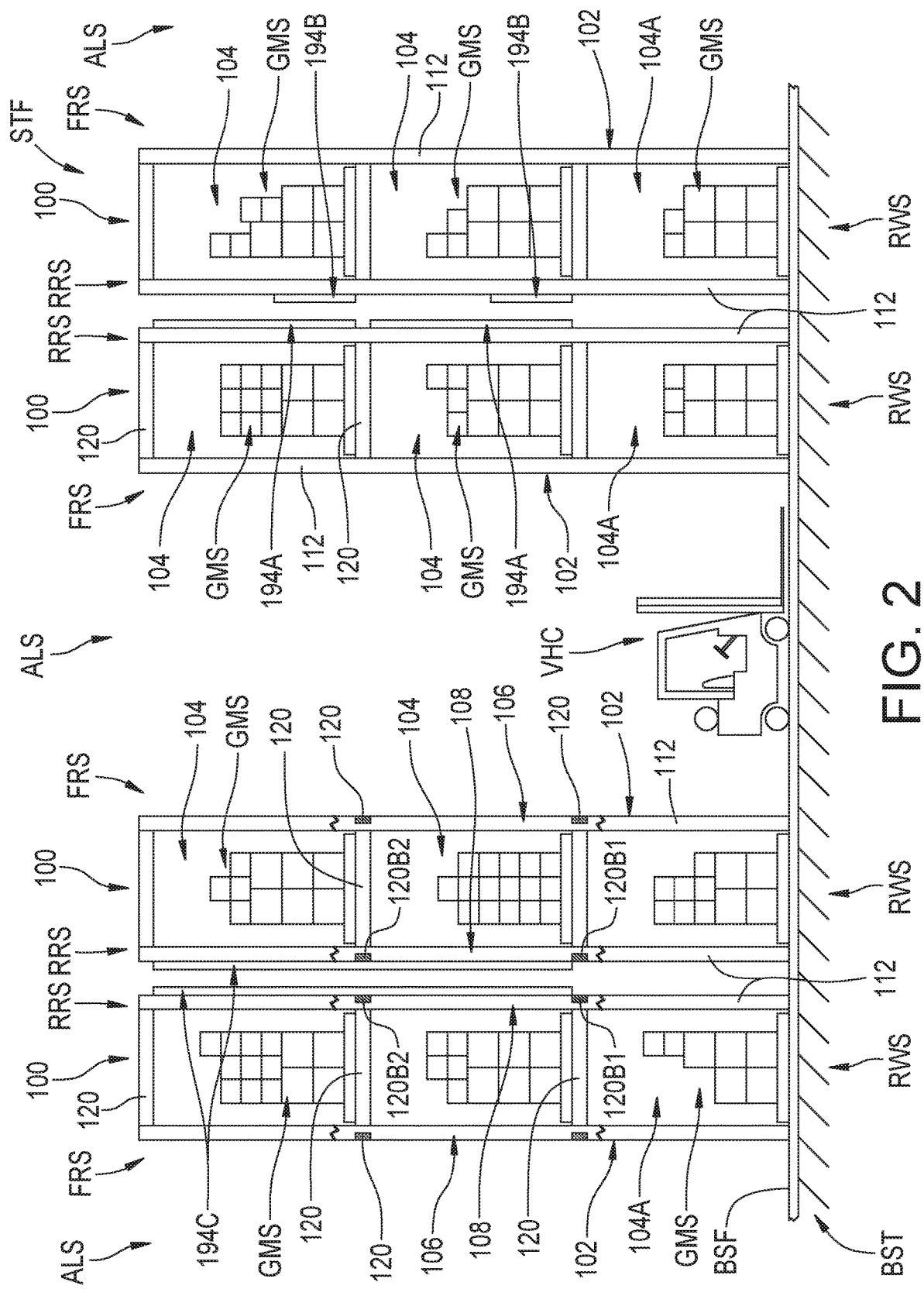
FIG. 2 is a side elevation view of a portion of the storage facility in FIG. 1 with rows of storage rack assemblies separated by an aisle.
Figure 3:
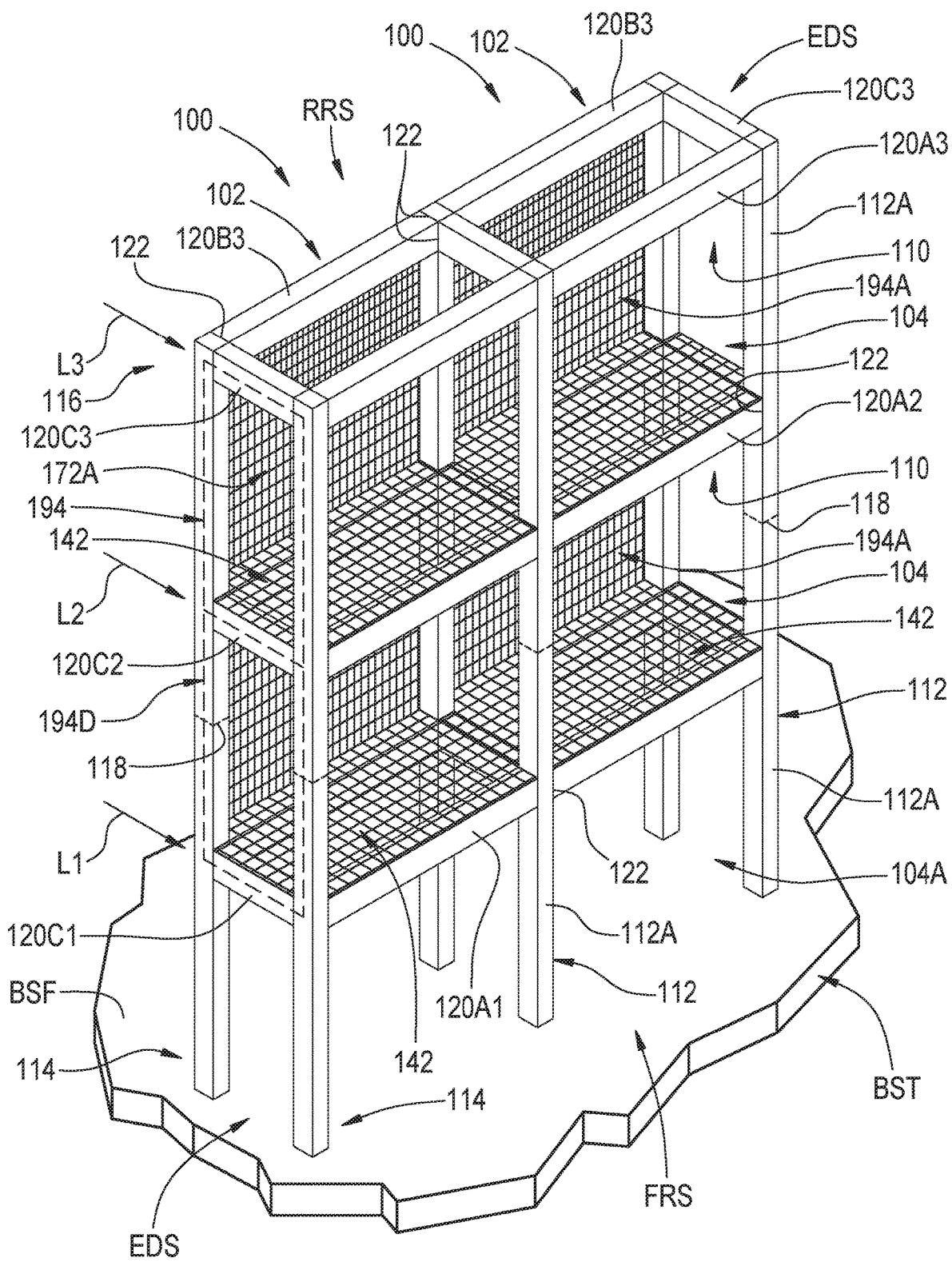
FIG. 3 is a top perspective view of one example of a plurality of storage rack assemblies in accordance with the subject matter of the present disclosure.

FIGS. 1-3 illustrate one example of a storage facility STF for short-term and/or long-term storage of goods and materials of a wide variety of types and kinds. Examples of such storage facilities can include enclosed storage facilities, such as warehouses, distribution centers and retail establishments as well as interior storage areas within or otherwise associated with manufacturing facilities, factories and plants and/or other industrial, commercial and/or retail spaces. Additional examples of storage facilities can include open-air storage facilities, such as covered and uncovered storage yards and/or other exterior areas associated with manufacturing facilities, factories and plants and/or other industrial, commercial and/or retail spaces. As such, it will be appreciated that the subject matter of the present disclosure is not intended to be limited to use in association with storage facilities of any particular type, kind, size and/or arrangement.

Storage facility STF is shown as including a base surface BSF on which one or more storage rack assemblies in accordance with the subject matter of the present disclosure can be supported. It will be appreciated that a base surface of any suitable type, kind and/or construction can be used. In many cases, the base surface will take the form of a prepared surface that is constructed and configured for vehicles to travel along and/or across. In some cases, such vehicles can include vehicles VHC (FIG. 2) constructed to lift and transport goods and materials, such as tow motors, forklifts (or forklift trucks), reach trucks, sideloaders and/or teletrucks, for example. Non-limiting examples of suitable base surfaces can include interior floors, exterior storage yards and other such areas. Base surfaces are commonly formed from a relatively hard and strong base material suitable for creating a relatively smooth and flat surface suitable for supporting one or more storage rack assemblies, the associated goods and materials stored thereon and any vehicles that may be used to transport the associated goods and materials on to, off of and/or otherwise between the storage rack assemblies and other areas. A non-limiting example of a material that may be suitable for use in forming a base surface can include steel-reinforced concrete. It will be appreciated, however, that other materials and/or constructions could alternately be used.

In the arrangement shown in FIGS. 1-3, storage facility STF is represented as taking the form of an interior storage facility that includes a base structure BST that at least partially forms base surface BSF. Storage facility STF can optionally include a roof structure RST that extends across at least a portion of base surface BSF. In some cases, the roof structure can be supported on base structure BST using one or more structural components and/or features, such as one or more columns, posts and/or walls, for example. In the arrangement shown in FIG. 1, for example, a plurality of walls WLS extend between base structure BST and roof structure RST, and at least partially enclose the storage facility to form an interior INT thereof.

A storage facility in accordance with the subject matter of the present disclosure, such as storage facility STF, for example, can include any suitable number of one or more storage rack assemblies. Additionally, it will be appreciated that such one or more storage rack assemblies in accordance with the subject matter of the present disclosure can be positioned, organized or otherwise arranged in any suitable manner relative to one another and/or any associated storage facility features (e.g., walls). In the arrangement shown in FIGS. 1 and 3, for example, a plurality of storage rack assemblies 100 are disposed in a plurality of rows RWS that are spaced apart from one another such that one or more aisles ALS are formed along one of the rows and/or between adjacent ones of a plurality of rows.

As indicated above, storage rack assemblies in accordance with the subject matter of the present disclosure can be positioned, organized or otherwise arranged in any suitable manner relative to one another such that goods and materials can be transferred into and out of, or otherwise onto and off of, the storage rack assemblies. It will be appreciated that storage rack assemblies are commonly arranged such that goods and materials are transferred into and out of, or otherwise onto and off of, the storage rack assemblies from a pre-established direction. As one example, storage rack assemblies 100 are shown as having a front (or front side) FRS and a rear (or rear side) RRS as well as one or more ends (or end sides) EDS. In some cases, storage rack assemblies 100 can be arranged end-to-end relative to one another to form rows RWS with front sides FRS facing a common direction and rear sides RRS facing the opposite direction. Additionally, in some cases, two storage rack assemblies 100 or rows of storage rack assemblies RWS can be arranged back-to-back such that front sides FRS thereof are accessible from along an aisle ALS. It will be appreciated, however, that other configurations and/or arrangements could alternately be used without departing from the subject matter of the present disclosure.

Storage rack assemblies 100 can include a storage rack structure 102 that at least partially defines one or more storage bays 104 disposed at a non-zero height above base surface BSF. In many cases, each storage rack structure 102 will include a base-level storage bay 104A that utilizes base surface BSF as the floor of the storage bay. Typically, each storage bay will include a front opening dimensioned for transferring goods and materials GMS (FIG. 2) into and out of, or otherwise onto and off of, storage rack assemblies 100. Additionally, each storage bay can include at least one of a rear opening and a side opening. In many cases, storage bays 104 will include a front opening 106, a rear opening 108 and at least one side opening 110. It will be appreciated, however, that other configurations, arrangements and/or constructions could alternately be used.

Storage rack structures 102 can be assembled or otherwise formed from any suitable combination of components, elements and/or assemblies. Additionally, it will be appreciated that such components, elements and/or assemblies can be formed from any suitable material or combination of materials. In many cases, various combinations of steel alloys are used. It will be appreciated, however, that other metals (e.g., aluminum) and/or other materials, such as non-metallic composites and/or metal/non-metal composites, could alternately be used.

The storage rack structures can include a plurality of elevational support members and a plurality of cross members that extend between and operatively interconnect two or more of the elevational support members. It will be appreciated that the elevational support members and cross members can be of any suitable type, kind and/or construction. As shown in FIGS. 1-3, for example, the plurality of elevational support members can take the form of columns 112 that extends vertically between a bottom or base end 114 that is supported on base surface BSF and a distal or upper end 116 that is at a non-zero height or distance from base surface BSF. In some cases, the plurality of columns can extend substantially continuously between the base end and the upper end. In other cases, plurality of columns 112 can include a plurality of interconnected column sections 112A that can be operatively connected with one another in a suitable manner. As examples, each column could include two or more sections 112A that are secured to one another by way of a corresponding number of one or more mechanical and/or flowed-material joints, such as are represented in FIG. 3 by dashed lines 118.

Storage rack structures 102 can include any suitable number of two or more of columns or other elevational support members. In some cases, each of storage rack structures 102 can be formed from four columns that include two front columns disposed along front side FRS and two rear columns disposed along rear side RRS. In some constructions, each of storage rack structures 102 can be separately and individually formed from four columns with adjacent storage rack structures also including four separate columns. In other constructions, however, each storage rack structure can be formed from four columns with two columns (e.g., two left columns or two right columns) being common to adjacent storage rack structures, such as is illustrated in FIGS. 1-3, for example.

As indicated above, storage rack structures 102 can include a plurality of cross members that operatively interconnect two or more of the plurality of columns that form the storage rack structures. As shown in FIGS. 1-10, 13, 15 and 16, the plurality of cross members can take the form of a plurality of rails or beams 120 that can be secured between columns 112 in any suitable manner. As examples, opposing ends of beams 120 can each be secured to a corresponding one of columns 112 by way of a mechanical and/or flowed-material joint, such as are represented in FIG. 3 by lines 122.

Plurality of beams 120 are assembled or otherwise secured onto columns 112 in groups or sets that together can at least partially define one or more of storage bays 104. In some cases, a given one of beams 120 may be common to two of storage bays 104, such as is shown in FIG. 3, for example. Storage rack structures 102 are shown in FIGS. 1-3 as including a plurality of levels disposed at increasing non-zero heights or distances from base surface BSF. In the arrangement shown, storage rack structures 102 include three discrete levels, which are identified by reference arrows L1, L2 and L3 in FIG. 3. It will be recognized that level L1 can at least partially define the top or upper extent of base-level storage bays 104A as well as a bottom or lower extent of storage bays 104 disposed between levels L1 and L2. Additionally, it will be recognized that level L2 can at least partially define the top or upper extent of storage bays 104 disposed between levels L1 and L2 as well as a bottom or lower extent of storage bays 104 disposed between levels L2 and L3. Furthermore, it will be recognized that level L3 can at least partially define the top or upper extent of storage bays 104 disposed between levels L2 and L3. It will be appreciated, however, that the foregoing description is merely one non-limiting example of a suitable construction and/or arrangement, and that other configurations could be used without departing from the subject matter of the present disclosure.

It will be appreciated that each level can include a plurality of beams 120. For example, the groups or sets of beams 120 that at least partially define each of levels L1-3 can include a corresponding one of front beams 120A1, 120A2 and 120A3 as well as a corresponding one of rear beams 120B1, 120B2 and 120B3. In a preferred arrangement, levels L1-3 can also include a corresponding one or more of side beams 120C1, 120C2 and 120C3. It will be recognized and understood, however, that additional structural features and/or components can also be used without departing from the subject matter of the present disclosure.

Figure 16:
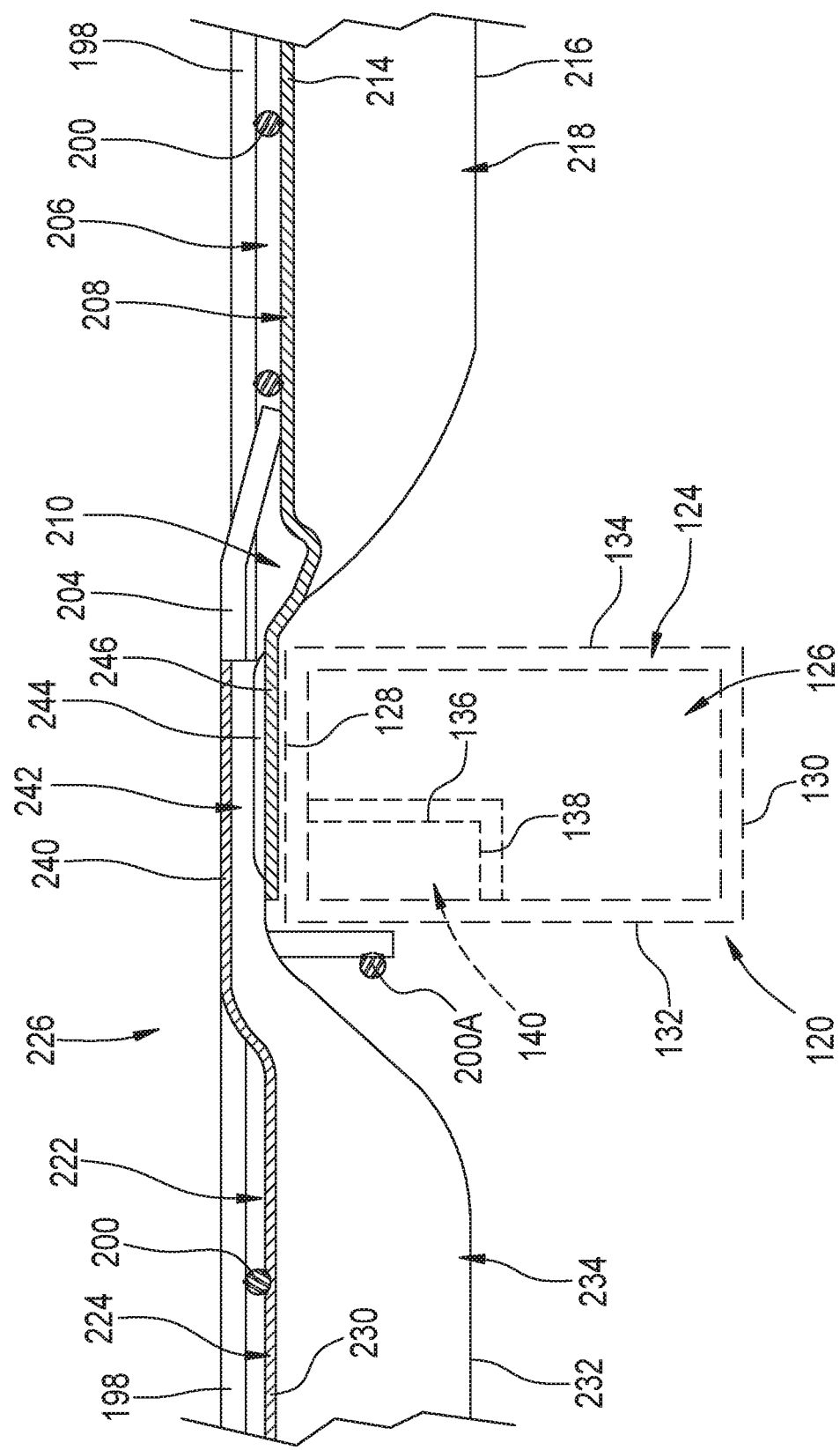
FIG. 16 is a cross-sectional view of the portion of the exemplary storage deck assembly in FIG. 15 taken from along line 16-16 therein.

It will be appreciated that plurality of beams 120 can be of any suitable size, shape, type, kind, configuration and/or construction. For example, beams 120 could have an approximately rectangular cross-sectional shape, such as is shown in FIGS. 2, 3 and 16. As another example, beams 120 could have a cross-sectional shape that is approximately rectangular with a notch or recess formed along one or more corners thereof. As such, it will be appreciated that beams 120 can include any suitable combination of walls, wall portions, surfaces, surface portions and/or areas. For example, with further reference to FIG. 16, beams 120 can include a beam wall 124 that at least partially defines a hollow interior 126. Beam wall 124 can include a top or upper surface (or surface portion) 128 and a bottom or lower surface (or surface portion) 130 facing opposite upper surface 128. Side surfaces (or surface portions) 132 and 134 can be oriented transverse to the upper and lower surfaces, and can face generally opposite one another. In preferred arrangement, one of the side surfaces will face in an inward direction and the opposing side surface will face in an outward direction. It will be appreciated that side surface 132 and 134 will either be inward or outward depending on which storage bay is being referenced in connection with the discussion thereof. In cases in which beams 120 have a cross-sectional shape with notched, recessed or other features, beam walls 124 can, optionally, include a side surface (or surface portion) 136 that is spaced from side surface 134 in a direction toward side surface 132. In such cases, a shoulder surface (or surface portion) 138 can extend between and operatively connect side surfaces 134 and 136 such that a step 140 extends lengthwise along one or more of beams 120.

Storage rack assemblies 100 can also include one or more storage deck sections in accordance with the subject matter of the present disclosure, such as are represented in FIGS. 4-8 by reference numbers 142 and/or 144. The storage deck sections can be supported on or along storage rack structure 120, such as on or along one or more common beams thereof, for example. Storage decks 142 and 144 are constructed to function as at least a portion of the floor of the storage bay within which the storage deck section is installed. In such case, goods and materials GMS in palletized or unpalletized form can be positioned within storage bays 104 on storage deck sections 142 and/or 144 for long-term and/or short-term storage. It will be appreciated that storage deck sections 142 and/or 144 can be of cooperative constructions that are configured to be supported on a common rail while at least partially overlapping or otherwise interengaging one another in a manner that results in a minimal deviation between the normal deck height along the overlapping portions of the storage deck sections. It will be appreciated that storage decks 142 and 144 can be otherwise formed from any suitable materials or combinations of materials, such as metal materials (e.g., steel and/or aluminum) and/or polymeric materials (e.g., high-strength thermoplastic and/or fiber-reinforced thermoplastic materials).

One example of a suitable construction for storage deck sections 142 and 144 is shown in FIGS. 4-8 as including a deck sheet 146 that is at least partially formed from a plurality of deck wires, such as may be formed from a metal material (e.g., a steel alloy). In some cases, the plurality of deck wires can be organized into a grid pattern with a plurality of first deck wires 148 disposed in a first orientation and a plurality of second deck wires 150 disposed in a second orientation that is transverse (e.g., approximately perpendicular) to the first orientation of the plurality of first deck wires. Plurality of first deck wires 148 can be spaced apart from one another by a first deck offset dimension DOD1 that is approximately uniform between adjacent ones of deck wires 148. Plurality of second deck wires 150 can be spaced apart from one another by a second deck offset dimension DOD2 that is approximately uniform between adjacent ones of deck wires 150. In some cases, the first and second deck offset dimensions can be approximately equal to one another. In other cases, one of the first and second deck offset dimensions can be greater than the other of the first and second deck offset dimensions. In the arrangement shown in FIGS. 4-8, for example, second deck offset dimension DOD2 is greater than first deck offset dimension DOD1. It will be appreciated, however, that other configurations could alternately be used.

Figure 4:
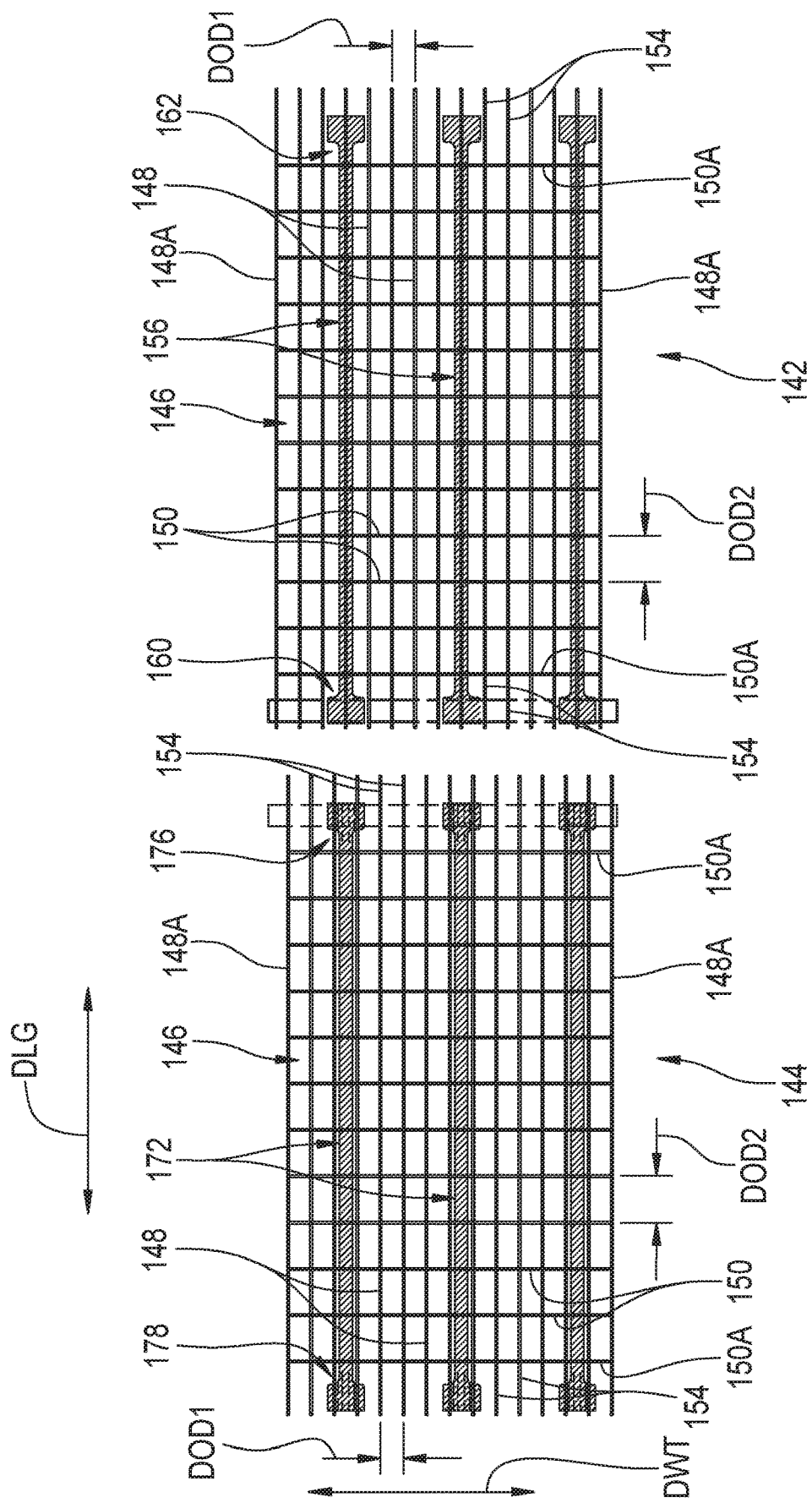
FIG. 4 is a top plan view of one example of storage decks in accordance with the subject matter of the present disclosure shown prior to assembly on a common rack beam.
Figure 5:
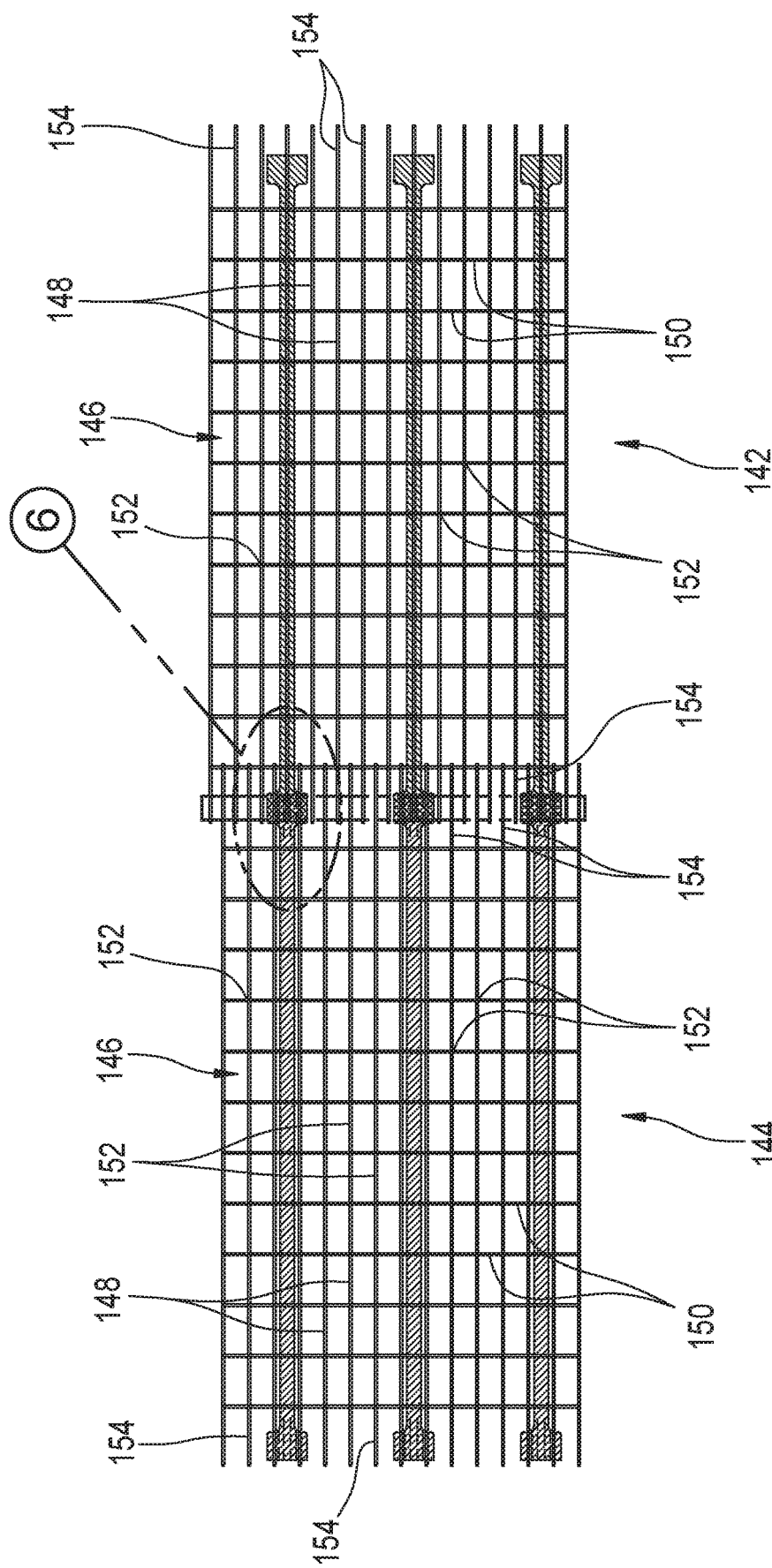
FIG. 5 is a top plan view of the exemplary storage decks in FIG. 4 shown assembled on a common rack beam.

The plurality of deck wires can be operatively connected with one another in any suitable manner. As one example, plurality of first deck wires 148 can be supported in abutting engagement along plurality of second deck wires 150, and attached or otherwise secured thereto by way of flowed-material joints 151. In some cases, plurality of first deck wires 148 can include edge wires 148A that are the outermost wires (e.g., first and last of the series wires) of the plurality. Additionally, or in the alternative, plurality of second deck wires 150 can include edge wires 150A that are the outermost wires (e.g., first and last of the series of wires) of the plurality. In such cases, edge wires 148A and 150A can at least partially define an outer periphery of deck sheet 146. As such, it will be appreciated that storage decks 142 and 144 can, in some cases, extend between opposing edges that at least partially define a deck length and opposing edges that at least partially define a deck width, such as is represented in FIG. 4 by arrows DLG and DWT, respectively.

In the arrangement shown in FIGS. 4-8, deck wires 148 include deck portions 152 that at least partially define a support surface of storage decks 142 and extension portions 154 that extend outwardly beyond deck portions 152. In some cases, deck wires 150 can be disposed along a first or under side of deck wires 148 along deck portions 152 and inside of extension portions 154. In such cases, edge wires 148A can, optionally, be disposed along a second or opposing side of deck wires 146 that is outside of extension portions 154.

In some cases, one or more additional features and/or elements can be included on or along storage decks 142, such as may provide added strength and/or rigidity to the storage decks, for example. As one example, storage deck sections 142 can include one or more support channels 156 that can be secured on, along or otherwise across the plurality of deck wires of deck sheet 146. In the arrangement shown in FIGS. 4-8, for example, support channels 156 include a channel wall 158 that extends lengthwise between opposing ends 160 and 162. As non-limiting examples, channel wall 158 of support channels 156 can have an approximately U-shaped or approximately V-shaped cross-sectional configuration or profile with a central wall portion 164 that extends outwardly to channel edges 166 that at least partially define an open end 168 of support channels 156. In a preferred arrangement, support channels 156 can be oriented such that a closed-end (not numbered) of the cross-sectional profile of central wall portion 164 is disposed in abutting engagement with deck wires 150 and secured thereto by way of one or more flowed-material joints 170. It will be appreciated, however, that other configurations and/or arrangements could alternately be used.

Additionally, in some cases, storage deck sections 144 can include one or more support channels 172 that can be secured on, along or otherwise across the plurality of deck wires of deck sheet 146. In the arrangement shown in FIGS. 4-8, support channels 172 include a channel wall 174 that extends lengthwise between opposing ends 176 and 178. Channel wall 174 of support channels 172 can have an approximately U-shaped or an approximately V-shaped cross-sectional configuration with a central wall portion 180 that extends outwardly to channel edges 182 that at least partially define an open end 184 of support channels 172. In a preferred arrangement, support channels 172 can be oriented such that a closed-end (not numbered) of the cross-sectional profile of central wall portion 180 is disposed in abutting engagement with deck wires 150 and secured thereto by way of flowed-material joints 186. It will be appreciated, however, that other configurations and/or arrangements could alternately be used.

Figure 6:
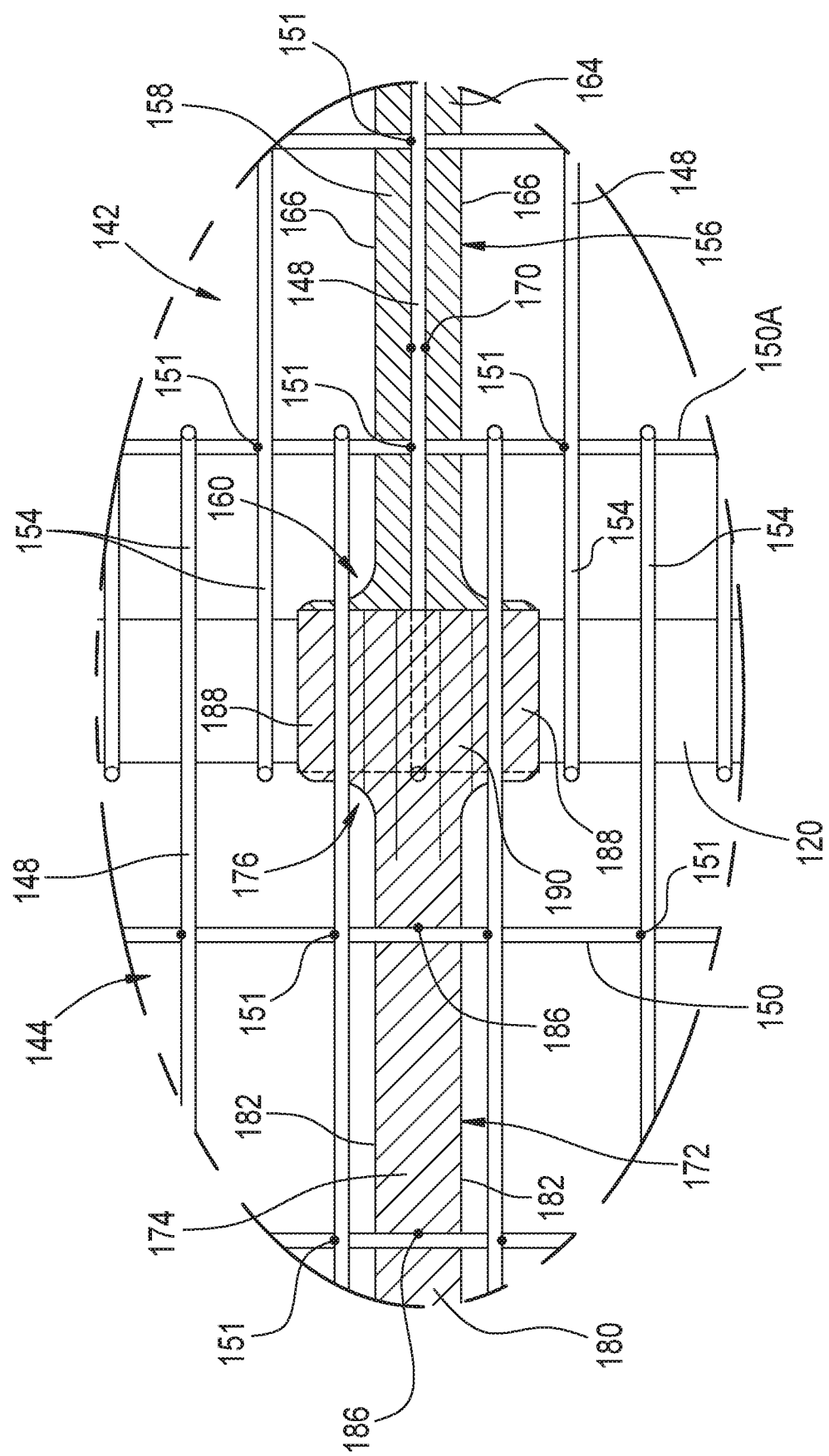
FIG. 6 is an enlarged view of the portion of the exemplary storage decks identified as Detail 6 is FIG. 5.
Figure 7:
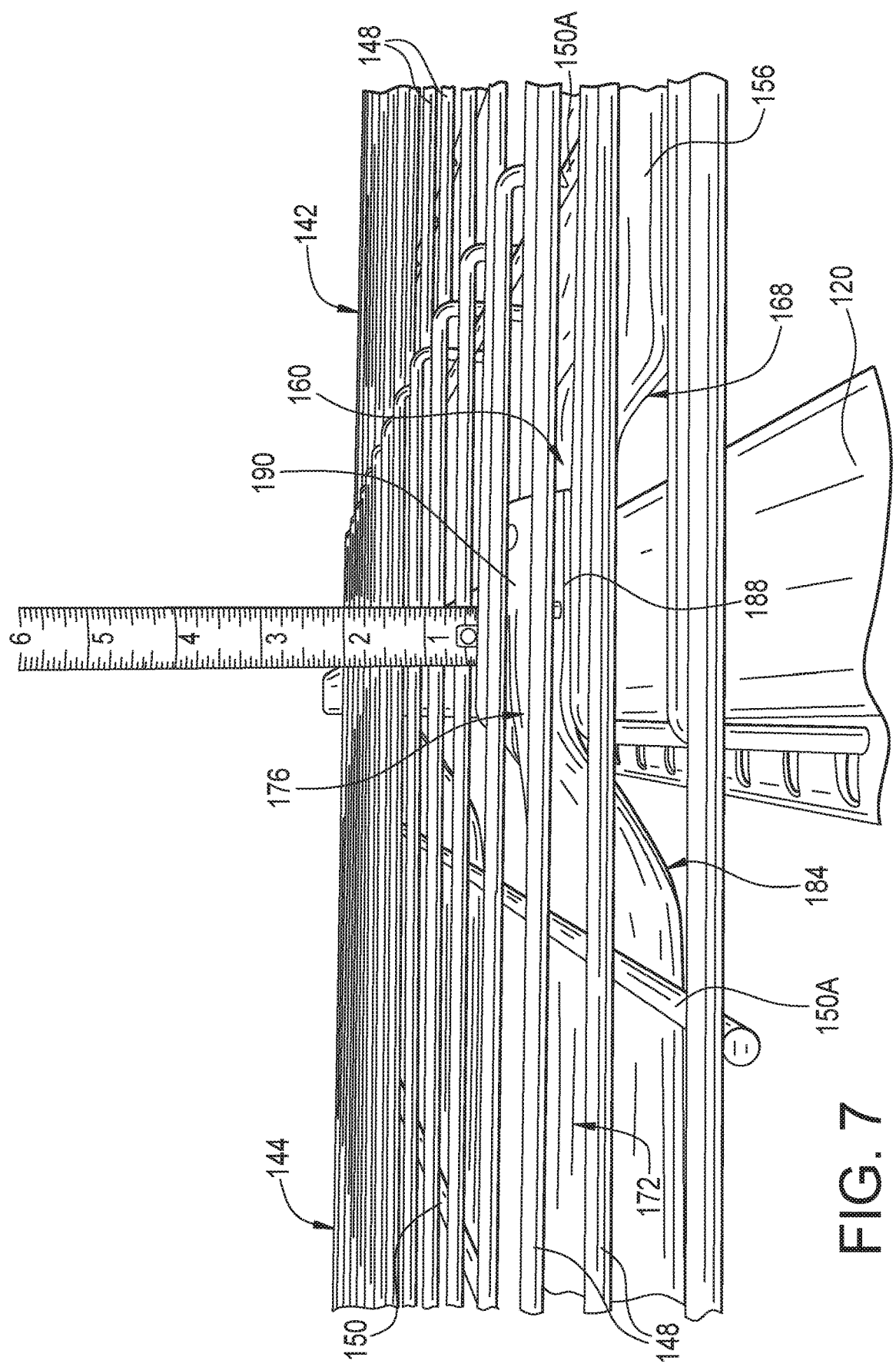
FIG. 7 is a front perspective view of the exemplary storage deck assembly shown in FIGS. 3-6.
Figure 8:
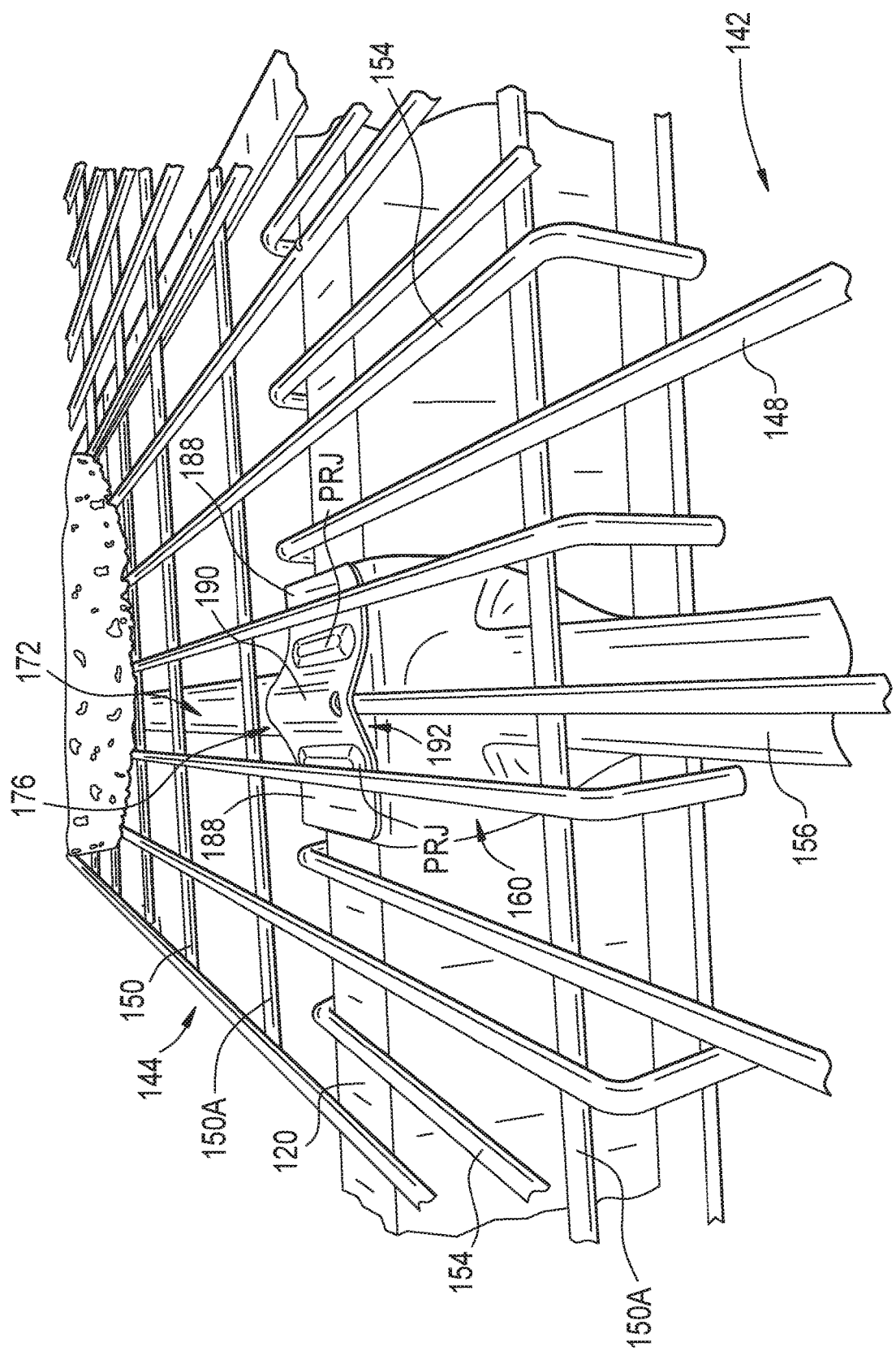
FIG. 8 is a side perspective view of the exemplary storage deck assembly shown in FIGS. 3-7.

Support channels 156 and support channels 172 differ from one another at least in that one or more of ends 160 and 162 of support channels 156 are and dimensioned to abuttingly engage a top surface of common beam 120. Whereas, one or more of ends 176 and 178 are dimensioned to fit over a portion of one of deck wires 148 of storage deck section 142. In a preferred arrangement, one or more of ends 176 and/or 178 can include one or more outer or flange wall portions 188 and a tunnel wall portion 190 disposed between flange wall portions 188. In a preferred arrangement, tunnel wall portion 190 at least partially forms a clearance tunnel 192 that is dimensioned receive at least a portion of one of deck wires 148, such as is shown in FIGS. 6-8, for example.

Storage rack assemblies can also include one or more barrier panel assemblies that are supported on or along the storage rack structure and extend across at least a portion of one of the storage bays thereof. Additionally, the one or more barrier panel assemblies can be captured between the storage rack structure and one of the storage decks to thereby secure or otherwise retain the one or more barrier panel assemblies on or along the storage rack structure. It will be appreciated that the one or more barrier panel assemblies can be captured, secured or otherwise retained on the storage rack structure without the use of fasteners, flowed-material joints or other securement devices and/or features extending between or otherwise operatively connecting the barrier panel assemblies (or components thereof) to the storage rack structure (or components thereof).

Stated differently, one or more components of the barrier panel assembly can be supported in abutting engagement along one or more components of the storage rack structure. Additionally, the storage deck can, in some cases, be supported on or along one or more components of the storage rack structure. In such cases, the storage deck can extend over or otherwise overlap the one or more components of the barrier panel assembly that are supported in abutting engagement on or along the one or more component of the storage rack structure and thereby prevent or at least substantially inhibit the removal or other inadvertent disassociation of the barrier panel assembly from the storage rack structure. It will be appreciated that such a barrier panel assembly can extend across or otherwise at least partially cover at least a portion of one or more of the openings of one or more storage bays 104.

As one example, barrier panel assemblies 194A are shown in FIGS. 2 and 3 extending across a substantial portion of rear openings 108 of storage bays 104 in both the vertical and horizontal directions. As another example, barrier panel assemblies 194B are shown in FIG. 2 as extending across a substantial portion of rear openings 108 in the horizontal direction while extending only partially across the rear openings in the vertical direction. As a further example, barrier panel assemblies 194C are shown in FIG. 2 as extending vertically between two storage bays 104. In such cases, barrier panel assemblies 194C can be dimensioned such that the barrier panel assemblies extend horizontally across approximately one-half of each of the two storage bays such that two of barrier panel assemblies 194C can be installed side-by-side to substantially-entirely cover the rear openings of both storage bays. As a further example, one or more barrier panel assemblies can extend across or otherwise at least partially cover at least a portion of one or more of side openings 110 of storage bays 104, such as are represented in FIG. 3 by dashed lines 194D.

Another example of a suitable construction for storage deck sections 142' and 144' is shown in FIGS. 9-17 as including a deck sheet 196 that is at least partially formed from a plurality of deck wires, such as may be formed from a metal material (e.g., a steel alloy). In some cases, the plurality of deck wires can be organized into a grid pattern with a plurality of first deck wires 198 disposed in a first orientation and a plurality of second deck wires 200 disposed in a second orientation that is transverse (e.g., approximately perpendicular) to the first orientation of the plurality of first deck wires. Plurality of first deck wires 198 can be spaced apart from one another by a first deck offset dimension DOD1 that is approximately uniform between adjacent ones of deck wires 198. Plurality of second deck wires 200 can be spaced apart from one another by a second deck offset dimension DOD2 that is approximately uniform between adjacent ones of deck wires 200. In some cases, the first and second deck offset dimensions can be approximately equal to one another. In other cases, one of the first and second deck offset dimensions can be greater than the other of the first and second deck offset dimensions. In the arrangement shown in FIGS. 9-17, for example, second deck offset dimension DOD2 is greater than first deck offset dimension DOD1. It will be appreciated, however, that other configurations could alternately be used.

Figure 9:
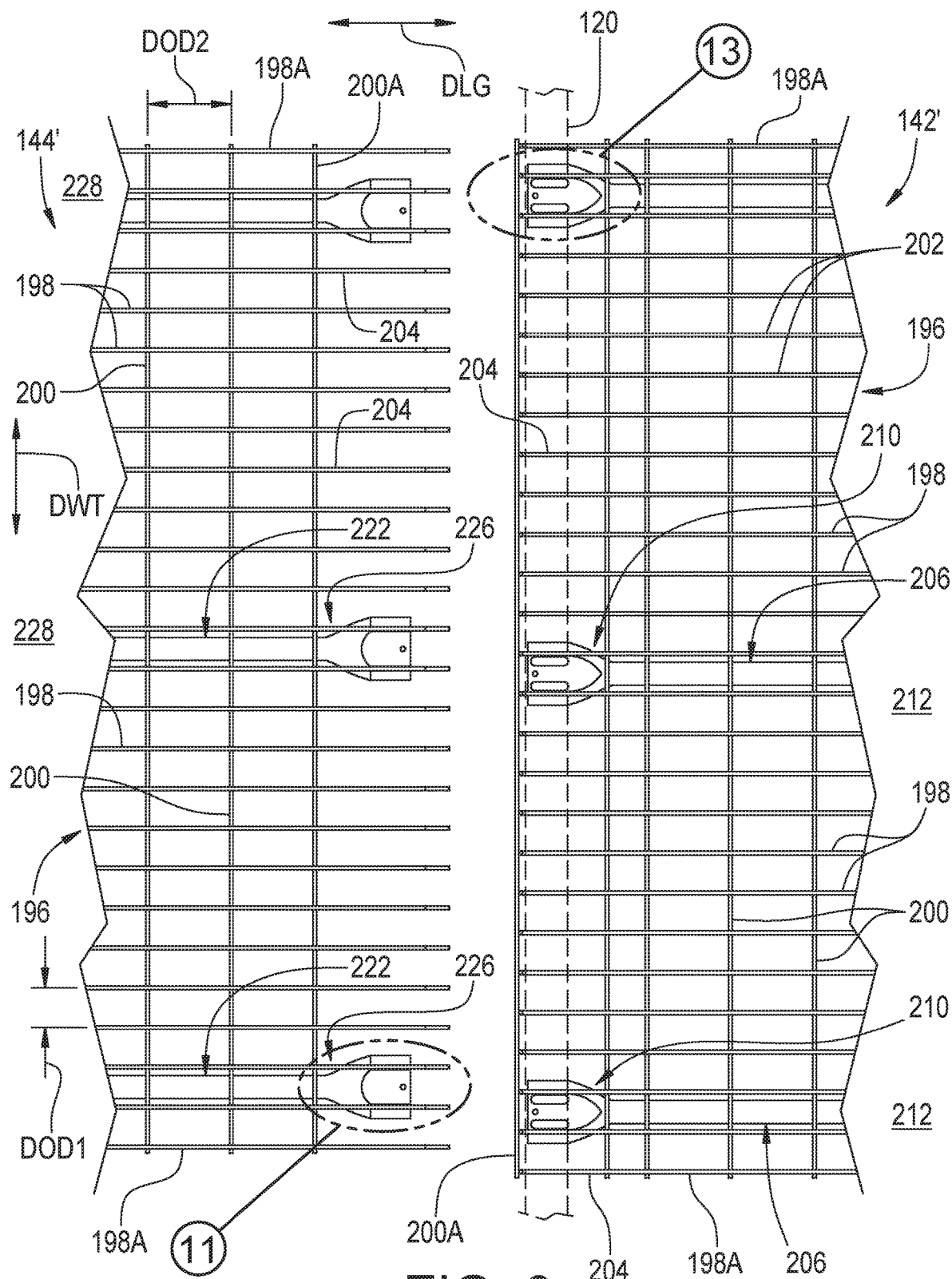
FIG. 9 is a top plan view of another example of storage decks in accordance with the subject matter of the present disclosure shown prior to assembly on a common rack beam.
Figure 10:
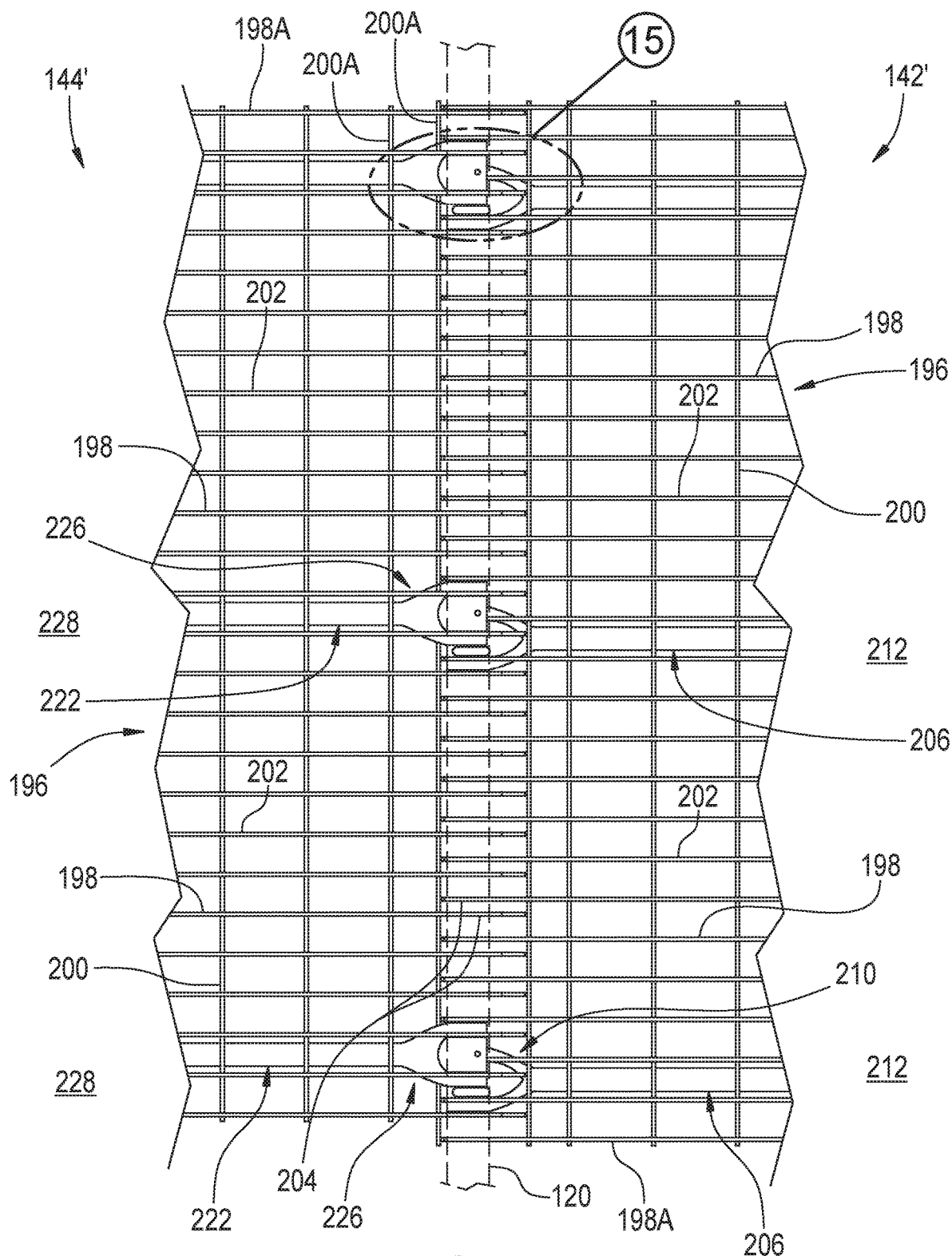
FIG. 10 is a top plan view of the exemplary storage decks in FIG. 9 shown assembled on a common rack beam.
Figure 11:
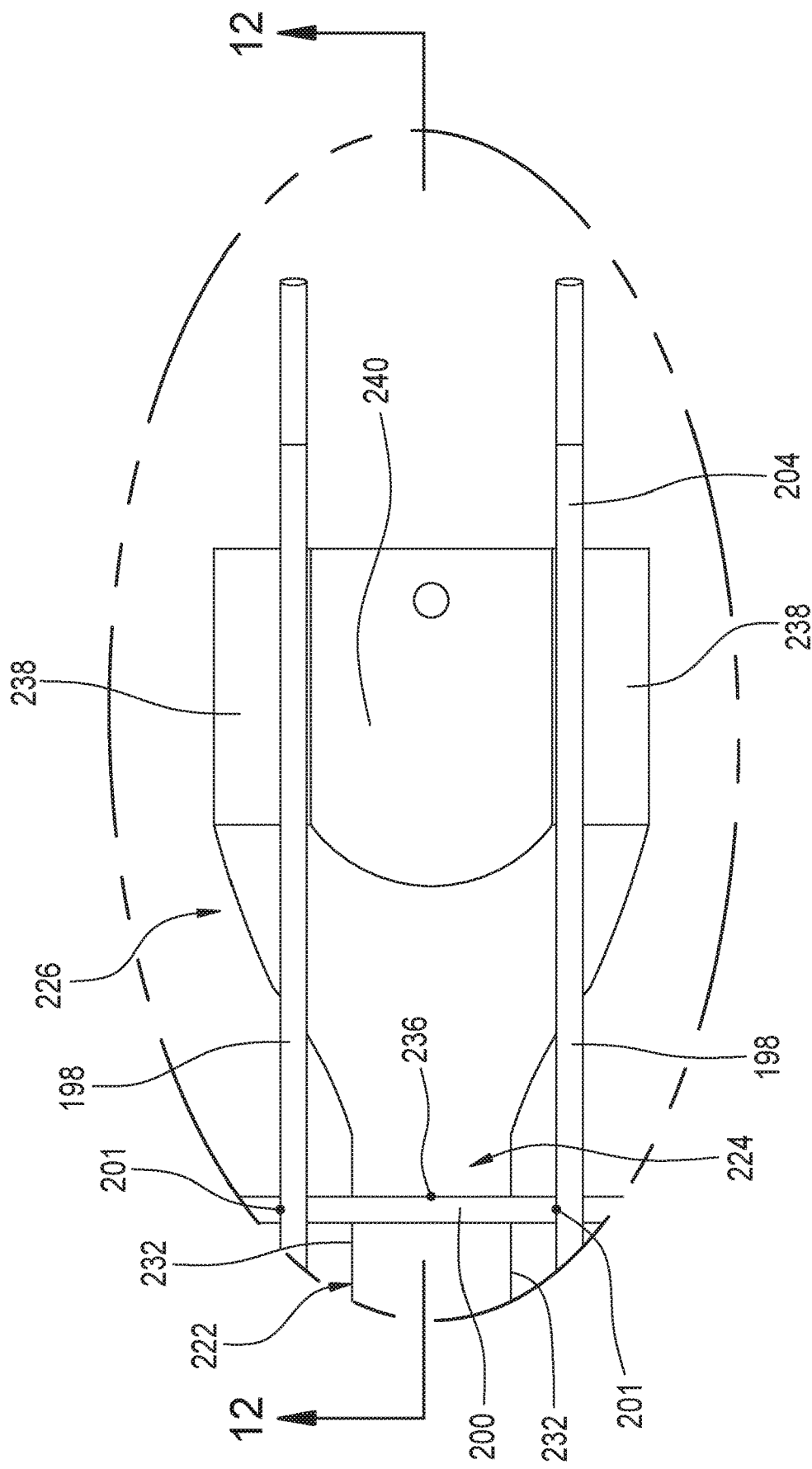
FIG. 11 is an enlarged view of the portion of the exemplary storage deck in FIGS. 9 and 10 identified as Detail 11 is FIG. 9.
Figure 12:
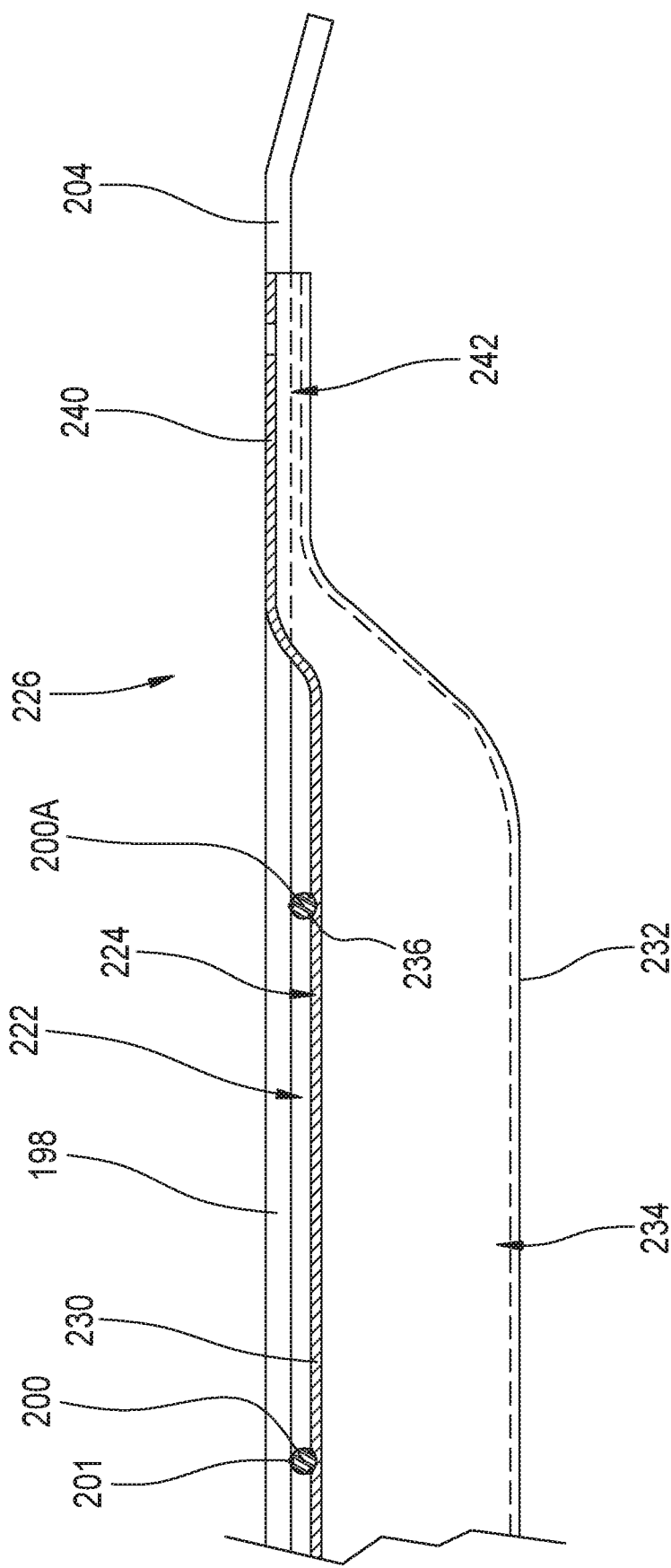
FIG. 12 is a cross-sectional view of the portion of the exemplary storage deck in FIG. 11 taken from along line 12-12 therein.
Figure 13:
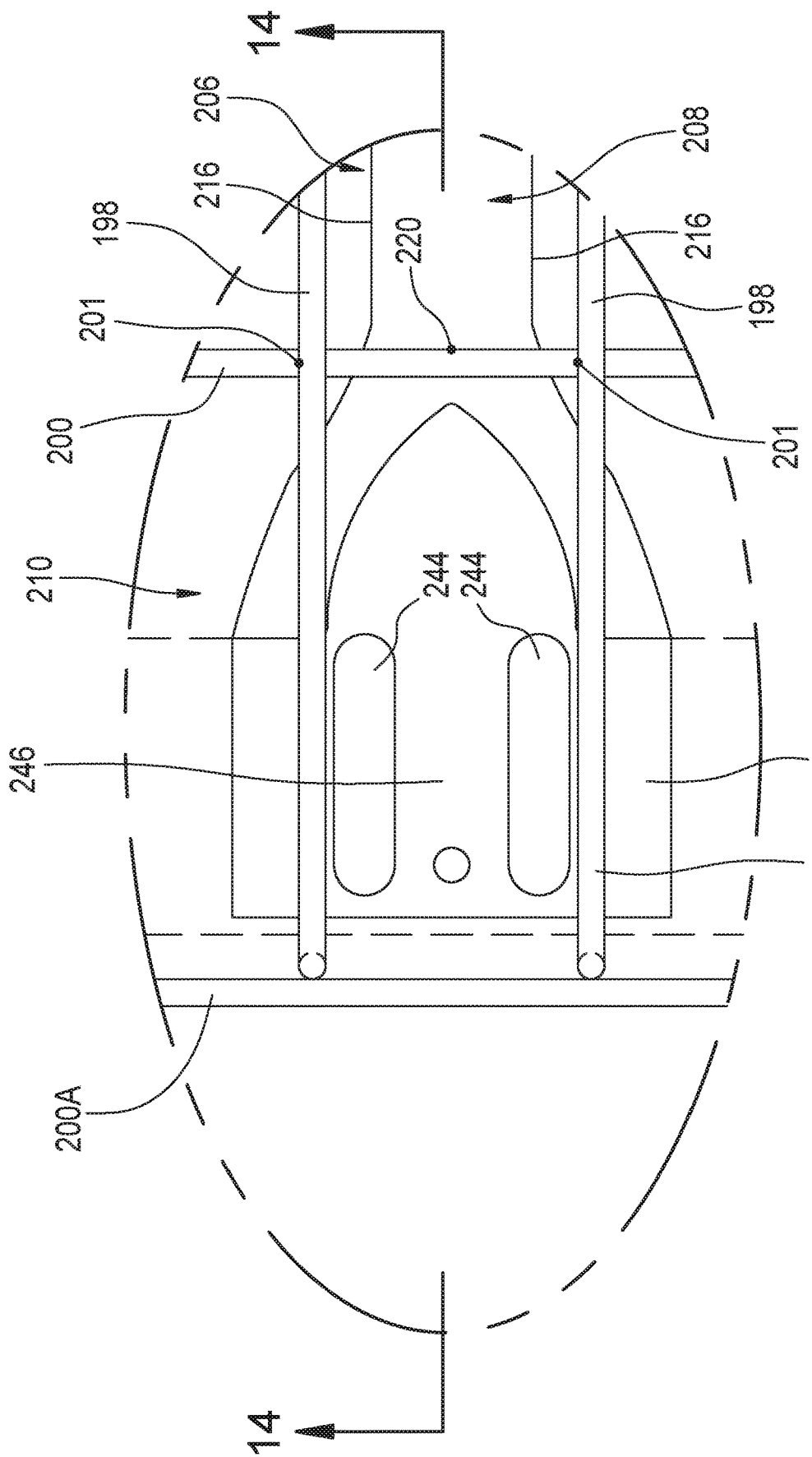
FIG. 13 is an enlarged view of the portion of the exemplary storage deck in FIGS. 9 and 10 identified as Detail 13 is FIG. 9.
Figure 14:
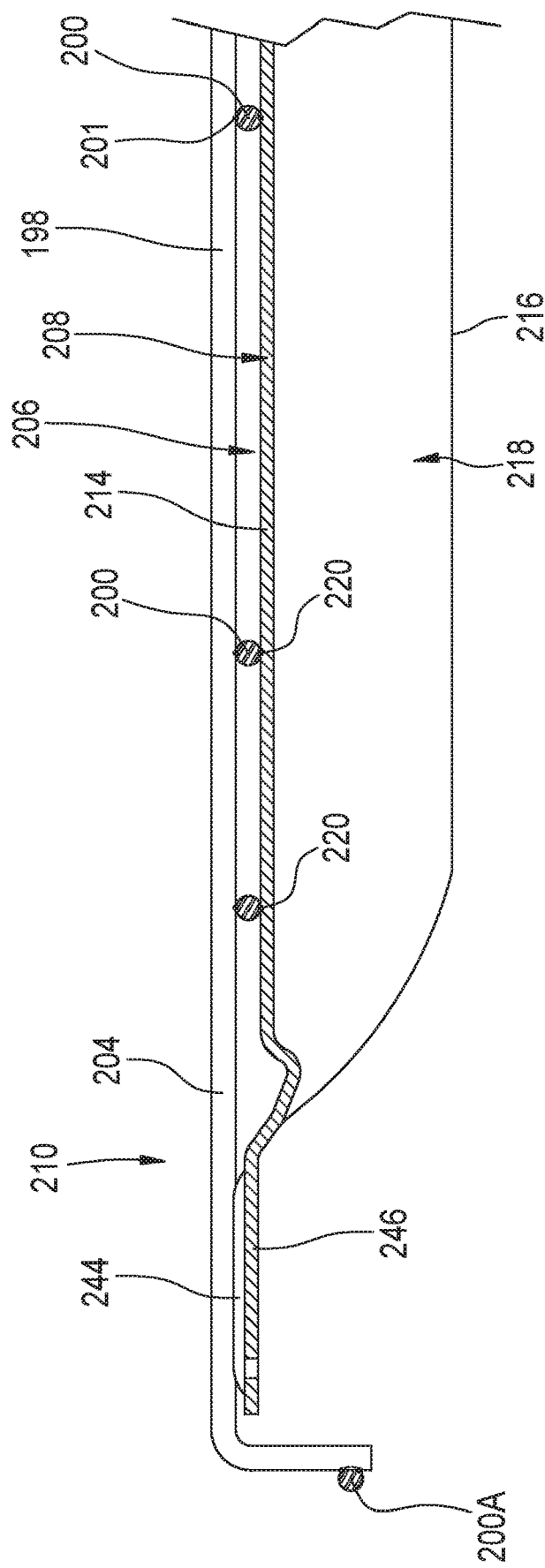
FIG. 14 is a cross-sectional view of the portion of the exemplary storage deck in FIG. 13 taken from along line 14-14 therein.

The plurality of deck wires can be operatively connected with one another in any suitable manner. As one example, plurality of first deck wires 198 can be supported in abutting engagement along plurality of second deck wires 200, and attached or otherwise secured thereto by way of flowed-material joints 201. In some cases, plurality of first deck wires 198 can include edge wires 198A that are the outermost wires (e.g., first and last of the series wires) of the plurality. Additionally, or in the alternative, plurality of second deck wires 200 can include edge wires 200A that are the outermost wires (e.g., first and last of the series of wires) of the plurality. In such cases, edge wires 198A and 200A can at least partially define an outer periphery of deck sheet 196. As such, it will be appreciated that storage decks 142' and 144' can, in some cases, extend between opposing edges that at least partially define a deck length and opposing edges that at least partially define a deck width, such as is represented in FIG. 9 by reference dimensions DLG and DWT, respectively.

In the arrangement shown in FIGS. 9-17, deck wires 198 include deck portions 202 that at least partially define a support surface of storage decks 142' and extension portions 204 that extend outwardly beyond deck portions 202. In some cases, deck wires 200 can be disposed along a first or under side of deck wires 198 along deck portions 202 and inside of extension portions 204. In such cases, edge wires 198A can, optionally, be disposed along a second or opposing side of deck wires 198 that is outside of extension portions 204.

In some cases, one or more additional features and/or elements can be included on or along storage decks 142', such as may provide added strength and/or rigidity to the storage decks, for example. As one example, storage deck sections 142' can include one or more support channels 206 that can be secured on, along or otherwise across the plurality of deck wires of deck sheet 146'. In the arrangement shown in FIGS. 9-17, for example, support channels 206 include a channel wall 208 that extends lengthwise between opposing ends 210 and 212. As non-limiting examples, channel wall 208 of support channels 206 can have an approximately U-shaped or approximately V-shaped cross-sectional configuration or profile with a central wall portion 214 that extends outwardly to channel edges 216 that at least partially define an open end 218 of support channels 206. In a preferred arrangement, support channels 206 can be oriented such that a closed-end (not numbered) of the cross-sectional profile of central wall portion 214 is disposed in abutting engagement with deck wires 200 and secured thereto by way of one or more flowed-material joints 220. It will be appreciated, however, that other configurations and/or arrangements could alternately be used.

Additionally, in some cases, storage deck sections 144' can include one or more support channels 222 that can be secured on, along or otherwise across the plurality of deck wires of deck sheet 146'. In the arrangement shown in FIGS. 9-17, support channels 222 include a channel wall 224 that extends lengthwise between opposing ends 226 and 228. Channel wall 224 of support channels 222 can have an approximately U-shaped or an approximately V-shaped cross-sectional configuration with a central wall portion 230 that extends outwardly to channel edges 232 that at least partially define an open end 234 of support channels 222. In a preferred arrangement, support channels 222 can be oriented such that a closed-end (not numbered) of the cross-sectional profile of central wall portion 230 is disposed in abutting engagement with deck wires 200 and secured thereto by way of flowed-material joints 236. It will be appreciated, however, that other configurations and/or arrangements could alternately be used.

Figure 15:
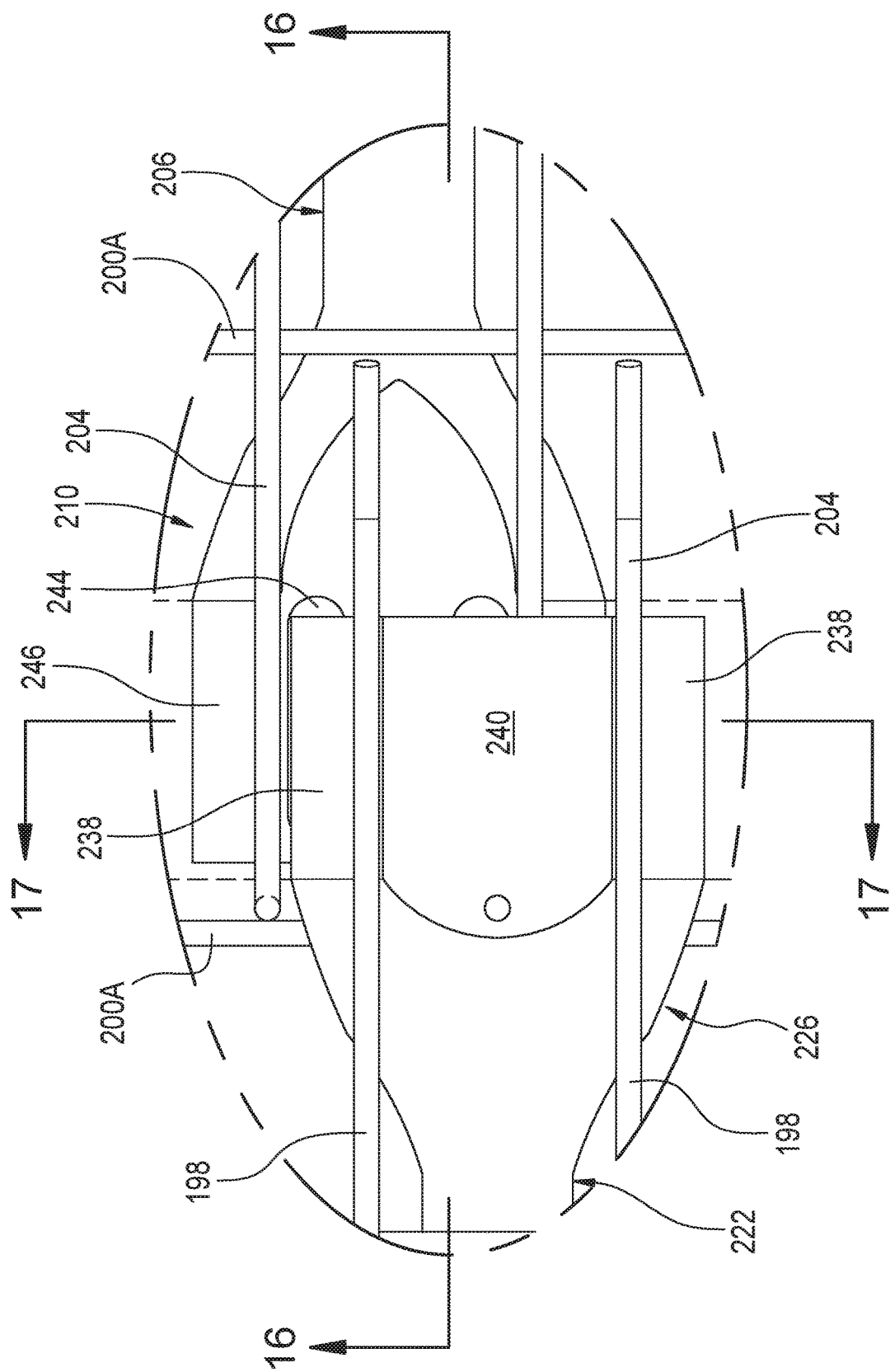
FIG. 15 an enlarged view of the portion of the exemplary storage deck assembly in FIGS. 9 and 10 identified as Detail 15 is FIG. 10.

Support channels 206 and support channels 222 differ from one another at least in that one or more of ends 210 and 212 of support channels 206 are dimensioned to abuttingly engage a top surface of common beam 120. Whereas, one or more of ends 226 and 228 are dimensioned to fit over a portion of one of deck wires 198 of storage deck section 142'. In a preferred arrangement, one or more of ends 226 and/or 228 can include one or more outer or flange wall portions 238 and a tunnel wall portion 240 disposed between flange wall portions 238. In a preferred arrangement, tunnel wall portion 240 at least partially forms a clearance tunnel 242 that is dimensioned receive at least a portion of one of deck wires 198, such as is shown in FIGS. 15-17, for example.

In the exemplary arrangements shown and described herein in connection with FIGS. 4-8 and FIGS. 9-17, it will be appreciated that one or more of extension portions 154 are coextensive with and can, optionally, be supported on or along one side of ends 160 and/or 162 of decking support channels 156 and/or one side of ends 176 and/or 178 of decking support channels 172. Similarly, extension portions 204 are shown as being coextensive with and can, optionally, be supported on or along one side of ends 210 and/or 212 of decking support channels 206 and/or one side of ends 226 and/or 228 of decking support channels 222.

Additionally, or in the alternative, one or more of the decking support channels 154, 172, 206 and/or 222 can include one or more ribs or projections formed on or along one or more ends thereof. For example, end 176 of decking support channel 172 is shown as including projections PRJ that extend outwardly from along one or more of flange wall portions 188 and/or tunnel wall portion 190, such as in a direction away from common beam 120, for example.

Additionally, or in the alternative, end 210 of decking support channel 206 can include one or more projections 244 extending outwardly from along one or more of planar wall portions 246 in a direction away from the common beam. In some cases, one or more of projections PRJ and/or 244 can abuttingly engage extension portions 154 and/or 204, such as to assist in maintaining the extension portions in a relative position and/or alignment, for example. In a preferred arrangement, the decking support channels shown and described herein can be integrally formed from a unitary section of material, such as a metal material, for example.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially permanent connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood that claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A storage rack assembly disposed on an associated base surface and having a front side and a rear side, said storage rack assembly comprising:
    a storage rack structure including a plurality of columns and a plurality of beams extending between and interconnecting said plurality of columns such that a plurality of storage bays are formed at a height above the associated base surface, said plurality of storage bays including a front, a rear and opposing sides with a first storage bay and a second storage bay disposed adjacent one another such that a common beam is disposed therebetween;
    a first storage deck supported on said storage rack structure within said first storage bay;
    a second storage deck supported on said storage rack structure within said second storage bay, said second storage deck including a deck wire; and,
    a first decking support channel including a channel wall, said first decking support channel extending underneath said first storage deck with said channel wall secured thereto, said channel wall including a channel end portion at least partially defining a clearance tunnel dimensioned to receive said deck wire of said second storage deck;
    said first and second storage decks at least partially supported on said common beam of said storage rack structure with said second storage deck positioned along said common beam and said first storage deck overlapping said common beam and said second storage deck such that said deck wire of said second storage deck extends through said clearance tunnel coextensively with said channel end portion.

2. A storage rack assembly according to claim 1, wherein said deck wire is one of a plurality of first deck wires of said second storage deck and said second storage deck includes a plurality of second deck wires that are oriented transverse to said plurality of first deck wires with said pluralities of first and second deck wires of said second storage deck secured together to at least partially form of said second storage deck.

3. A storage rack assembly according to claim 1, wherein said first storage deck includes a plurality of first deck wires and a plurality of second deck wires that are oriented transverse to said plurality of first deck wires with said pluralities of first and second deck wires secured together to at least partially form said first storage deck.

4. A storage rack assembly according to claim 3, wherein said first decking support channel is disposed between adjacent ones of said first deck wires of said first storage deck and secured to two or more of said plurality of second deck wires of said first storage deck.

5. A storage rack assembly according to claim 1 further comprising a second decking support channel extending underneath said second storage deck, said second decking support channel including a second channel end portion with said deck wire extending coextensively along said second channel end portion.

6. A storage rack assembly according to claim 5, wherein said second storage deck includes a plurality of first deck wires and a plurality of second deck wires that are oriented transverse to said plurality of first deck wires of said second storage deck with said pluralities of first and second deck wires of said second storage deck secured together to at least partially form said second storage deck, said second decking support channel being disposed between adjacent ones of said plurality of first deck wires of said second storage deck and secured to two or more of said plurality of said second deck wires of said second storage deck.

7. A storage rack assembly according to claim 5, wherein said second storage deck includes a plurality of first deck wires and a plurality of second deck wires that are oriented transverse to said plurality of first deck wires of said second storage deck with said pluralities of first and second deck wires of said second storage deck secured together to at least partially form said second storage deck, said second decking support channel being disposed along and secured to one of said plurality of first deck wires of said second storage deck.

8. A storage rack assembly disposed on an associated base surface and having a front side and a rear side, said storage rack assembly comprising:
    a storage rack structure including a plurality of columns and a plurality of beams extending between and interconnecting said plurality of columns such that a plurality of storage bays are formed at height above the associated base surface, said plurality of storage bays including a front, a rear and opposing sides with a first storage bay and a second storage bay disposed adjacent one another such that a common beam is disposed therebetween;
    a first storage deck assembly including a plurality of first deck wires and a first decking support channel, said plurality of first deck wires at least partially forming a first storage deck with a top and a bottom, said first decking support channel extending along said bottom of said first storage deck and attached thereto, said first decking support channel including a first channel wall with a first channel end portion with at least one first deck wire of said plurality of first deck wires extending coextensively along said first channel end portion, said first storage deck assembly supported on said storage rack structure within said first storage bay such that said first channel end portion and said at least one first deck wire are positioned across said common beam; and,
    a second storage deck assembly including a plurality of second deck wires and a second decking support channel, said plurality of second deck wires at least partially forming a second storage deck with a top and a bottom, said second decking support channel extending along said bottom of said second storage deck and attached thereto, said second decking support channel including a second channel wall with a first channel end portion including a clearance tunnel, said second deck assembly supported on said storage rack structure within said second storage bay such that said first channel end portion of said second decking support channel extends across said common beam and at least partially overlaps said first channel end portion of said first decking support channel from along an opposite side of said common beam.

9. A storage rack assembly according to claim 8, wherein said at least one first deck wire extends through said clearance tunnel and between said first channel end portions of said first and second decking support channels.

10. A storage rack assembly according to claim 8, wherein said common beam includes a top surface and said first channel end portion of said first decking support channel includes an approximately planar wall section disposed in abutting engagement with said top surface of said common beam.

11. A storage rack assembly according to claim 10, wherein said first channel end portion of said first decking support channel includes at least one rib formed therealong and projecting outwardly from said approximately planar wall section in a direction opposite said top surface of said common beam.

12. A storage rack assembly according to claim 8, wherein said first channel end portion of said second decking support channel includes a tunnel wall section that at least partially defines said clearance tunnel.

13. A storage rack assembly according to claim 12, wherein said first channel end portion of said second decking support channel includes at least one flange wall section extending outwardly along said common beam from said tunnel wall section.

14. A storage rack assembly according to claim 12, wherein said first channel end portion of said second decking support channel includes a first flange wall section extending from said tunnel wall section in a first direction and a second flange wall section extending from said tunnel wall section in a second direction opposite said first direction.

15. A storage rack assembly according to claim 13, wherein one of said tunnel wall section and said at least one flange wall section includes at least one rib formed therealong and projecting outwardly in a direction opposite said common beam.

16. A storage rack assembly according to claim 8, wherein said second decking support channel includes a second channel end portion with a central channel portion disposed between said first and second channel end portions of said second decking support channel.

17. A storage rack assembly according to claim 16, wherein said central channel portion of said second decking support channel has a cross-sectional profile with a closed end disposed along said second storage deck and two side wall segments that at least partially define an open end of said cross-sectional profile in spaced relation to said second storage deck relative to said closed end of said cross-sectional profile.

18. A storage rack assembly according to claim 8, wherein at least two of said plurality of first deck wires extend coextensively along said first channel end portion of said first decking support channel.

19. A storage rack assembly according to claim 8, wherein at least two of said plurality of second deck wires extend coextensively along said first channel end portion of said second decking support channel.

20. A storage deck assembly dimensioned to abuttingly engage an associated rail of an associated storage rack structure, said storage deck assembly comprising:

a plurality of first deck wires and a plurality of second deck wires that are oriented transverse to said plurality of first deck wires with said pluralities of first and second deck wires secured together to at least partially form a storage deck having a deck length, a deck width, a top and a bottom, said storage deck including a first deck edge and a second deck edge spaced lengthwise from said first deck edge; and, a decking support channel including a channel wall, said decking support channel having a channel length with a first channel end and a second channel end spaced lengthwise from said first channel end, said decking support channel extending along said bottom of said storage deck and attached thereto with said first channel end disposed adjacent said first deck edge and said second channel end disposed adjacent said second deck edge, said channel wall including a tunnel wall portion along said first channel end, said tunnel wall portion defining a clearance tunnel with two of said plurality of first deck wires extending coextensively along said first channel end, said tunnel wall portion positioned widthwise between said two of said plurality of first deck wires with said clearance tunnel having an open side facing away from said storage deck and dimensioned to receive an associated deck wire of an associated storage deck with the associated deck wire being of the same nominal size as one of said plurality of first deck wires of said storage deck when the associated storage deck is disposed on the associated storage rack structure adjacent said storage deck assembly such that the associated deck wire can extend through said clearance tunnel below said tunnel wall portion.

21. A storage deck assembly according to claim 20, wherein said first channel end includes a flange wall portion extending widthwise from said tunnel wall portion, said flange wall portion having a top surface portion and said tunnel wall portion having a tunnel bottom surface portion that is offset from said top surface portion of said flange wall portion in a direction toward said top of said storage deck.

* * * * *